(12) United States Patent
Lal et al.

(10) Patent No.: US 9,369,441 B2
(45) Date of Patent: Jun. 14, 2016

(54) END-TO-END SECURE COMMUNICATION SYSTEM

(71) Applicant: Intel Corporation, Santa Clara, CA (US)

(72) Inventors: Reshma Lal, Hillsboro, OR (US); Pradeep M. Pappachan, Hillsboro, OR (US); Krystof C. Zmudzinski, Forest Grove, OR (US); Micah J. Sheller, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/127,533

(22) PCT Filed: Jun. 4, 2013

(86) PCT No.: PCT/US2013/044112
§ 371 (c)(1),
(2) Date: Dec. 19, 2013

(87) PCT Pub. No.: WO2014/196963
PCT Pub. Date: Dec. 11, 2014

(65) Prior Publication Data
US 2015/0143118 A1    May 21, 2015

(51) Int. Cl.
*H04L 29/06* (2006.01)
*H04L 9/14* (2006.01)
*H04L 9/32* (2006.01)

(52) U.S. Cl.
CPC .............. *H04L 63/0428* (2013.01); *H04L 9/14* (2013.01); *H04L 9/3223* (2013.01); *H04L 63/062* (2013.01); *H04L 63/08* (2013.01); *H04L 2209/60* (2013.01)

(58) Field of Classification Search
CPC ... H04L 63/0428; H04L 63/062; H04L 63/08; H04L 9/3223; H04L 9/14; H04L 2209/60; G06F 2221/2107
USPC ......................................................... 713/168
See application file for complete search history.

(56) References Cited

U.S. PATENT DOCUMENTS 7,308,101 B2 * 12/2007 Wing ............................ 380/257
7,849,306 B2    12/2010 Takeshima et al.
(Continued)

FOREIGN PATENT DOCUMENTS

EP        1667398 A1      6/2006

OTHER PUBLICATIONS

Lal et al., "An Architecture Methodology for Secure Video Conferencing", 2013, IEEE, pp. 460-466.*
(Continued)

*Primary Examiner* — Matthew Smithers
(74) *Attorney, Agent, or Firm* — Grossman, Tucker, Perreault & Pfleger, PLLC

(57) ABSTRACT

The present disclosure is directed to an end-to-end secure communication system wherein, in addition to encrypting transmissions between clients, communication-related operations occurring within each client may also be secured. Each client may comprise a secure processing environment to process encrypted communication information received from other clients and locally-captured media information for transmission to other clients. The secure processing environment may include resources to decrypt received encrypted communication information and to process the communication information into media information for presentation by the client. The secure processing environment may also operate in reverse to provide locally recorded audio, image, video, etc. to other clients. Encryption protocols may be employed at various stages of information processing in the client to help ensure that information being transferred between the processing resources cannot be read, copied, altered, etc. In one example implementation, a server may manage interaction between clients, provision encryption keys, etc.

48 Claims, 10 Drawing Sheets

(56) References Cited

U.S. PATENT DOCUMENTS

| | | | |
|---|---|---|---|
| 2004/0117500 A1* | 6/2004 | Lindholm et al. | 709/231 |
| 2004/0165721 A1 | 8/2004 | Sano et al. | |
| 2004/0255037 A1 | 12/2004 | Corvari et al. | |
| 2005/0163316 A1 | 7/2005 | Wing | |
| 2007/0011344 A1 | 1/2007 | Paka et al. | |
| 2008/0077592 A1 | 3/2008 | Brodie et al. | |
| 2008/0148063 A1 | 6/2008 | Hanko et al. | |
| 2008/0154775 A1 | 6/2008 | Soukup | |
| 2009/0245521 A1 | 10/2009 | Vembu et al. | |
| 2009/0296929 A1 | 12/2009 | Wachtfogel et al. | |
| 2009/0316889 A1 | 12/2009 | Macdonald et al. | |
| 2011/0055886 A1 | 3/2011 | Bennett et al. | |
| 2011/0299680 A1* | 12/2011 | Vembu et al. | 380/200 |
| 2012/0079282 A1* | 3/2012 | Lowenstein et al. | 713/189 |
| 2012/0093319 A1 | 4/2012 | Saito | |
| 2012/0221853 A1 | 8/2012 | Wingert et al. | |
| 2012/0260094 A1 | 10/2012 | Asim et al. | |
| 2013/0006866 A1* | 1/2013 | Pendakur et al. | 705/50 |
| 2013/0028416 A1* | 1/2013 | Gagnon et al. | 380/200 |
| 2013/0091353 A1 | 4/2013 | Zhang et al. | |
| 2014/0359305 A1 | 12/2014 | Pappachan et al. | |
| 2015/0304736 A1 | 10/2015 | Lal et al. | |

OTHER PUBLICATIONS

Chen et al., "Multi-level Secure Video Streaming Over SRTP", 2005, 43rd ACM Southeast Conference, pp. 30-35.*

International Search Report and Written Opinion received for PCT Patent Application No. PCT/US2013/044112, mailed on Feb. 18, 2014, 14 pages.

International Search Report received for PCT Patent Application No. PCT/US2013/044140, mailed on Mar. 6, 2014, 3 pages.

International Preliminary Report on Patentability received for PCT Application No. PCT/US2013/044158, mailed on Dec. 17, 2015, 20 pages.

International Preliminary Report on Patentability received for PCT Application No. PCT/US2013/044112, mailed on Dec. 17, 2015, 14 pages.

International Preliminary Report on Patentability received for PCT Application No. PCT/US2013/044140, mailed on Dec. 17, 2015, 10 pages.

* cited by examiner

END-TO-END SECURE COMMUNICATION SYSTEM

This disclosure results from research conducted under Joint Development Agreement FA7000-11-2-0001-0132 between the Intel Corporation and the United States Department of Homeland Security (DHS) Center of Innovation at the United States Air Force Academy.

TECHNICAL FIELD

The present disclosure relates to electronic communication, and more particularly, to a communication system that secures both the communication stream and client operations.

BACKGROUND

The use of electronic communication continues to expand in all aspects of society. Online (e.g., over a network) audio and/or video interaction may occur within governmental entities, in the military, in professional conferencing and now even in personal interaction. In at least one example scenario, a user may wish to communicate with one or more other users over an online audio and/or video connection. The user may then configure a device (e.g., a client) to create a connection to the other users over a local-area network (LAN) and/or wide-area network (WAN) like the Internet. The clients may capture local sound/images/video and may also present sound/images/video captured from other users. At least one benefit of this interaction is that parties that are geographically distant can interact as if in the same location.

However, along with these benefits comes risk. It is often in the best interest of users participating in online communication to keep the information exchanged private, especially where the interaction may involve matters of national security, confidential business matters, sensitive private information, etc. Contrary to this objective, hackers having criminal and/or seemingly altruistic goals (e.g., "hacktivists") may seek to intercept, record, alter, etc. online communication. A countermeasure employed to combat these efforts involves encrypting all information sent between clients so that only the clients containing appropriate private keys may decrypt the communication stream. While securing client-to-client communication may protect the content of the communication signal, the operations occurring locally on each client (e.g., audio and/or video processing, capture and/or presentation) are left unprotected. These operations are vulnerable to various malware that may be installed on the client device.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
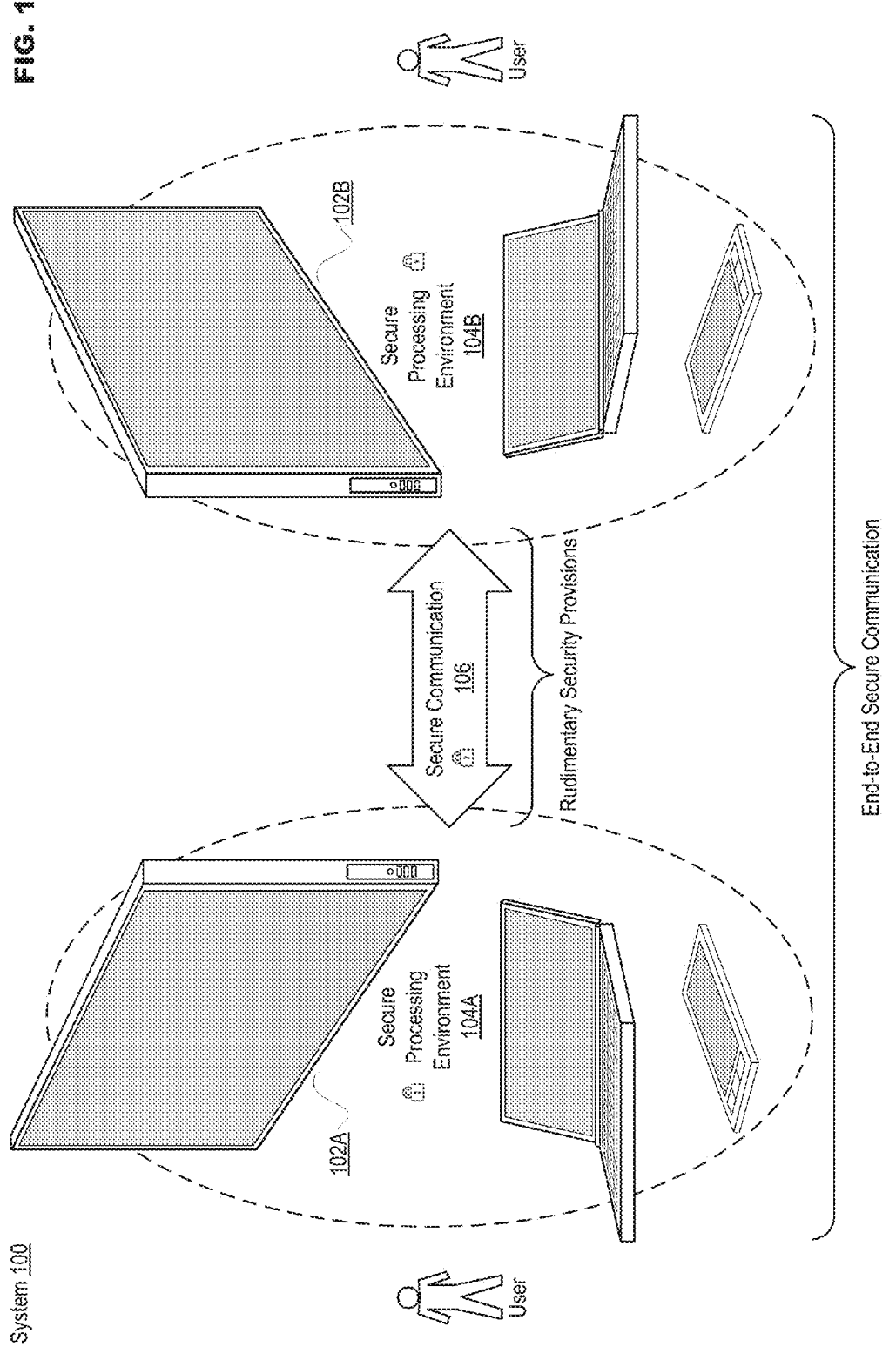
FIG. 1 illustrates an example end-to-end secure communication system in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to an end-to-end secure communication system. A communication system may be secure from "end-to-end" in that, for example, in addition to encrypting communications transmitted between clients, communication-related operations occurring within each client may also be secured. For example, each client may comprise a secure processing environment to process encrypted communication information received from other clients and locally-captured media information for transmission to other clients. In particular, the secure processing environment may include resources to decrypt received encrypted communication information and to process the communication information into media information for presentation by the client. The resources of the secure processing environment may also operate in reverse to provide locally recorded audio, image, video, etc. to other clients in a safe manner. Encryption protocols may be employed at various stages of information processing in the client to help ensure that information being transferred between the processing resources cannot be read, copied, altered, etc. In one example implementation, a centralized server may manage interaction between clients, provision encryption keys, etc.

In one embodiment, a device may comprise, for example, at least a communication module, a user interface module and a secure processing environment. The communication module may be to receive at least encrypted communication information as part of a secure communication session. The user interface module may be to cause media information to be presented by the device. The secure processing environment may be to at least decrypt the received encrypted communication information based on a first encryption protocol, process the decrypted communication information into the media information, encrypt the media information based on a second encryption protocol and provide the encrypted media information to the user interface module.

The first encryption protocol may be, for example, a Secure Real-Time Transport Protocol (SRTP). The media information may comprise at least one of audio information or video information, and causing media information to be presented may include at least one of causing sound to be generated based on the audio information or causing at least one image or video to be displayed based on the video information. In an example implementation consistent with the present disclosure, the user interface module may comprise media processing resources to receive the encrypted media information from the secure processing environment, decrypt the encrypted media information based on the second encryption protocol, process the decrypted media information into presentation information and encrypt the presentation information based on a third encryption protocol. The user interface module may then further comprise user interface equipment to receive the encrypted presentation information from the media processing resources, decrypt the encrypted presentation information based on the third encryption protocol and cause at least one of sound to be generated or at least one image or video to be displayed based on the decrypted presentation information. The second encryption protocol may be a Protected Audio Video Path (PAVP) protocol, while the third encryption protocol may be a High-bandwidth Digital Copyright Protection (HDCP) protocol.

In one embodiment, the secure processing environment may comprise resources including, for example, key provisioning resources, encryption/decryption resources for the first and second encryption protocols and media compression/decompression (codec) resources. The key provisioning resources may be at least to authenticate the device with a server and to obtain an encryption key for the first encryption protocol. The secure processing environment may further comprise auditing resources to at least log information about the secure communication session. It is also possible for the device to further comprise at least a processing module and a memory module, the processing module being to load the secure processing environment resources into the memory module, the secure processing environment resources being encrypted when loaded into the memory module and decrypt the encrypted secure processing environment resources when executed. In executing a reversal of operations wherein media information is locally captured (e.g., recorded by user interface equipment in, or at least coupled to, the device) and provided to other clients, the user interface module is further to capture media information, encrypt the captured media information based on the second encryption protocol and provide the encrypted captured media information to the secure processing environment. The secure processing environment may then further be to receive the encrypted captured media information from the user interface module, decrypt the encrypted captured media information based on the second encryption protocol, process the decrypted captured media information into communication information, encrypt the communication information based on the first encryption protocol; and provide the encrypted communication information to the communication module. The communication module may then further be to transmit the encrypted communication information as part of the communication session.

An example method consistent with the present disclosure may comprise receiving encrypted communication information in a communication module in a device, the encrypted communication being part of a secure communication session, decrypting the encrypted communication information in a secure processing environment in the device, the decryption being based on a first encryption protocol, processing the decrypted communication information into media information in the secure processing environment, encrypting the media information in the secure processing environment, the encryption being based on a second encryption protocol and providing the encrypted media information to a user interface module in the device. Other embodiments that will be disclosed herein may comprise, for example, a more detailed discussion of secure interactions that may occur between the secure processing environment and the user interface module wherein an encryption mediator may be introduced into the device and may be entrusted with managing these secure interactions.

FIG. 1 illustrates an example end-to-end secure communication system in accordance with at least one embodiment of the present disclosure. Example secure communication system 100 may comprise, for example, two or more devices 102. Devices 102 (e.g., device 102A and device 102 B) may also be referred to as clients 102 (e.g., client 102A and client 102B) in the following disclosure when discussing device operation in terms of an electronic communication session. As disclosed in FIG. 1, examples of device 102 may include a mobile communication device such as a cellular handset or a smartphone based on the Android® operating system (OS), iOS®, Windows® OS, Blackberry® OS. Palm® OS, Symbian® OS, etc., a mobile computing device such as a tablet computer like an iPad®, Surface®. Galaxy Tab®, Kindle Fire®, etc., an Ultrabook® including a low-power chipset manufactured by Intel Corporation, a netbook, a notebook, a laptop, a palmtop, etc., a stationary computing device such as a desktop computer, a set-top device, a smart television (TV), an audio and/or video electronic conferencing system, etc.

In an example of operation, a user of device 102A may desire to interact with a user of device 102B. The desired interaction may be verbal and/or may include video depending on the abilities of devices 102A and 102B. In pursuit of this goal, device 102A or 102B may initiate a communication link to the corresponding device. Client 102A (e.g., device 102A acting as a communication client), may then capture local sound, images and/or video for transmission to client 102B, and conversely, client 102B may capture local sound, images and/or video for transmission to client 102A. In this manner the user of clients 102A and 102B may interact as if in the same room though they may actually be geographically distant.

However, as the security of electronic communication became a larger concern, some measures were introduced to help maintain the privacy of the communication. Prior security provisions have relied on protecting the audio and video streams transmitted over a network by encrypting them (e.g., secure communication 106). Secure communication 106 may be deemed to provide "rudimentary" security in that the content of the communication is at least protected when most vulnerable. Secure communication 106 may be encrypted just prior to being sent by a client, and may remain encrypted until received by a client. While this form of protection (e.g., possibly along with some other rudimentary measures such as the use of tamper resistant software) may have been suitable to ensure privacy in the past, hackers have developed new attacks that may easily circumvent these protections. Techniques such as reverse engineering, the use of malware running at elevated privileged levels (e.g., rootkits) and hardware-based attacks have reduced the affectivity of previous rudimentary security provisions in that these techniques attack the communication stream where it may be most vulnerable: during the decryption and processing that takes place prior to media presentation. Thus, given only rudimentary security protection hackers are still able to eavesdrop on audio and/or video communication streams, channel classified, proprietary or personal information to outside collaborators, inject or modify portions of the audio or video stream, compromise existing authentication provisions to allow unauthorized parties to participate in or observe the communication, compromise the security policies for protecting communication, access communication session history information and possibly preventing history logging, etc.

Consistent with various embodiments of the present invention, security for electronic communication may be provided end-to-end through implementation of defensive measures that protect both the communication and the communicators (e.g., clients 102A and 102B). For example, in addition to secure communication 106, secure processing environment 104A may be included in client 102A and secure processing environment 104B may be included in client 102B. Secure processing environments 104A and 1041 may continue to protect secure communication 106 by making sure that its content is not determinable until presentation to the user. This may be accomplished by incorporating some of the information processing previously left unprotected in devices 102A and 102B into secure processing environments 104A and 104B. Moreover, content may be protected when being moved between different processing operations within clients 102A and 102B through various encryption protocols. More specific examples of how end-to-end security may be implemented, consistent with embodiments of the present disclosure, will be discussed in reference to subsequent figures.

Figure 2:
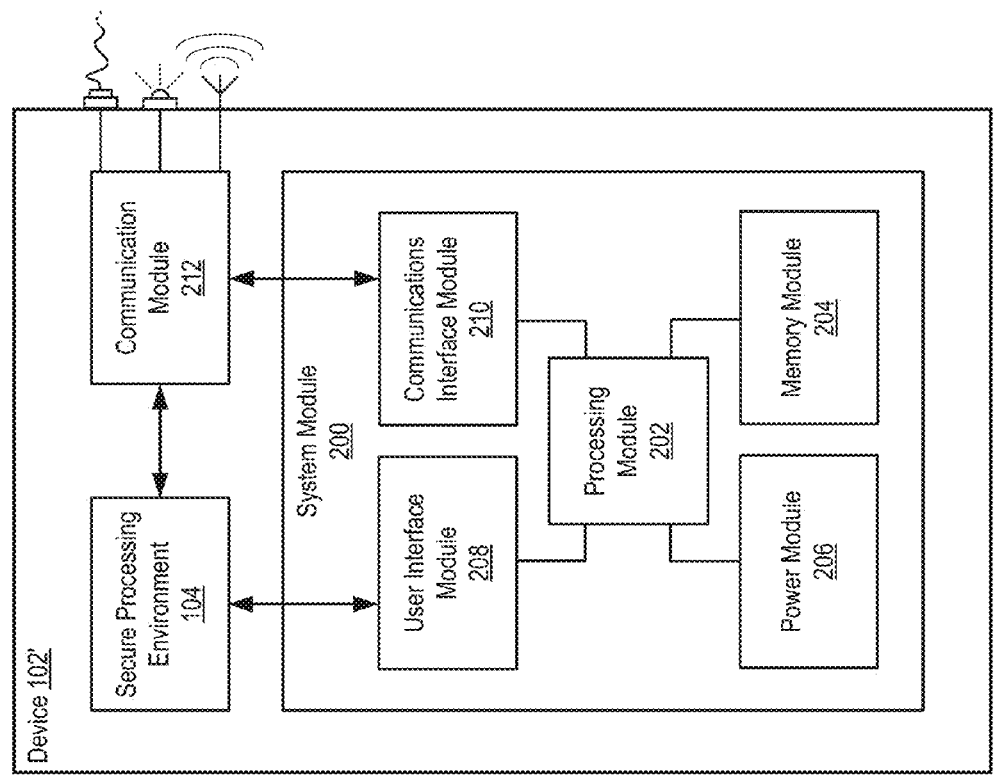
FIG. 2 illustrates an example configuration for a device usable in an end-to-end secure communication system in accordance with at least one embodiment of the present disclosure.

FIG. 2 illustrates an example configuration for device 102' usable in accordance with at least one embodiment of the present disclosure. In particular, device 102' may perform example functionality such as disclosed with respect to devices 102A and 102B in FIG. 1. However, it is important to note that device 102' is meant only as an example of equipment that may be used in accordance with embodiments consistent with the present disclosure, and is not meant to limit these various embodiments to any particular manner of implementation.

Device 102' may comprise system module 200 configured to manage device operations. System module 200 may include, for example, processing module 202, memory module 204, power module 206, user interface module 208 and communication interface module 210 that may be configured to interact with communication module 212. Device 102' may also include secure processing environment 104 configured to interact with at least user interface module 208 and communication module 212. While communication module 212 and secure processing environment 104 have been shown separately from system module 200, this example implementation of device 102' is merely for the sake of explanation herein. Some or all of the functionality associated with communication module 212 and/or secure processing environment 104 may also be incorporated within system module 200.

In device 102', processing module 202 may comprise one or more processors situated in separate components, or alternatively, may comprise one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 102'. Some or all of the functionality commonly associated with the support circuitry may also be included in the same physical package as the processor (e.g., an SoC package like the Sandy Bridge integrated circuit available from the Intel Corporation).

Processing module 202 may be configured to execute various instructions in device 102'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include memory configured to hold information during the operation of device 102' such as, for example, static RAM (SRAM) or Dynamic RAM (DRAM). ROM may include memories such as bios or Unified Extensible Firmware Interface (UEFI) memory configured to provide instructions when device 102' activates, programmable memories such as electronic programmable ROMs (EPROMS). Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc. Power module 206 may include internal power sources (e.g., a battery) and/or external power sources (e.g., electromechanical or solar generator, power grid, fuel cell, etc.), and related circuitry configured to supply device 102' with the power needed to operate.

User interface module 208 may include equipment and software configured to allow users to interact with device 102' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and output mechanisms (e.g., speakers, displays, lighted/flashing indicators, electromechanical components for vibration, motion, etc.). Communication interface module 210 may be configured to handle packet routing and other control functions for communication module 212, which may include resources configured to support wired and/or wireless communications. Wired communications may include serial and parallel wired mediums such as, for example. Ethernet, Universal Serial Bus (USB), Firewire. Digital Video Interface (DVI). High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, WLAN, Wi-Fi, etc.) and long range wireless mediums (e.g., cellular wide-area radio communication technology that may include, for example, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12). UTRA (UMTS Terrestrial Radio Access). E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard), satellite-based communications, etc. In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission.

In the embodiment illustrated in FIG. 2, secure processing environment 104 may be configured to interact with at least user interface module 208 and communication module 212. For example, secure processing module 104 may receive encrypted communication information to other clients 102 via communication module 212, may process the received encrypted communication information, and then provide the processed information to user interface module 212 for presentation to a user. Secure processing environment 104 may be based on, for example, secure enclave technology. For example, the identity of programs (e.g., a cryptographic hash measurement of each program's contents) may be signed and stored inside each program. When the programs are loaded, the processor verifies that the measurement of the program (e.g., as computed by the processor) is identical to the measurement previously embedded inside the program. The signature used to sign the embedded measurement is also verifiable because the processor is provided with a public key used to verify the signature at program load time. This way malware can't tamper with the program without also altering its verifiable measurement. Malware also cannot spoof the signature because the signing key is secure with the program's author. In this manner, the resident software may not be read, written to or altered by any malware. Moreover, in one embodiment device 102' may comprise more than one secure processing environment 104. Different secure processing environments 104 (e.g., secure enclaves) may comprise software corresponding to different functional aspects of secure communication session 100. For example, audio aspects may be separate from video aspects, front-end processing may be separate from processing occurring just prior to presentation, etc. Having more than one secure processing environment 104 may provide additional security because one secure processing environment 104 becoming compromised (e.g., by malware) may still leave the security of the remaining secure processing environments 104 intact and protected.

Figure 3:
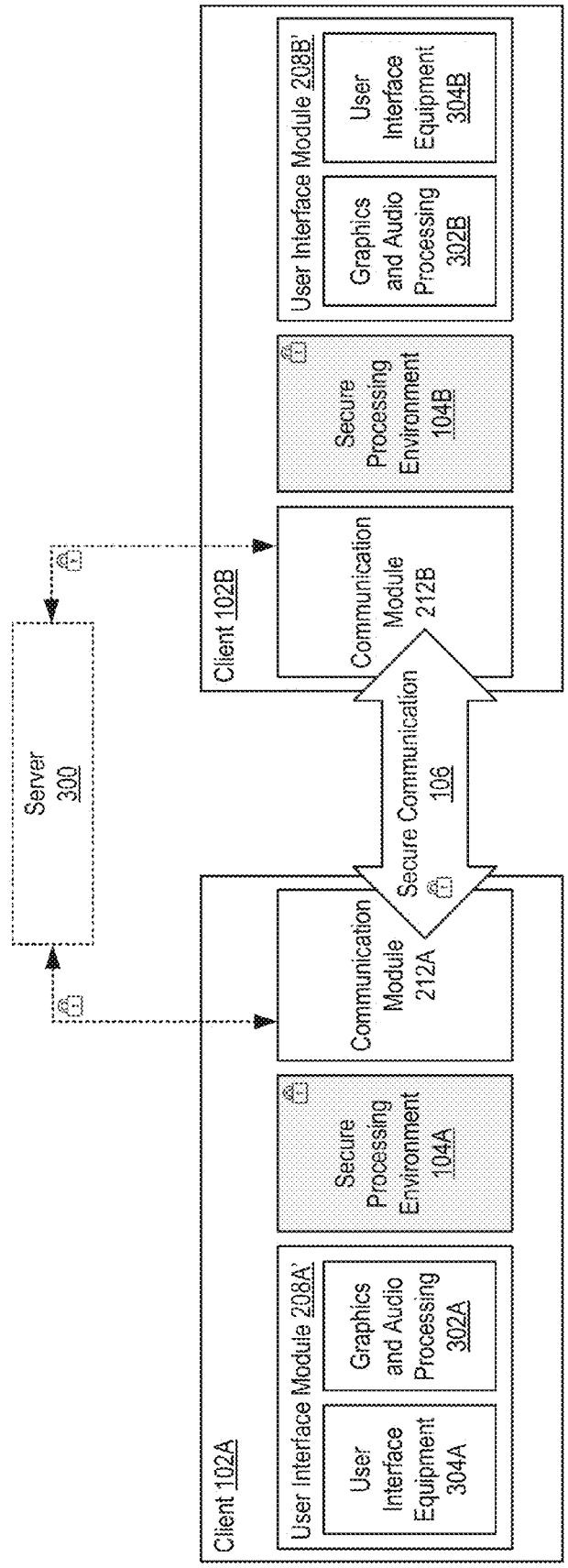
FIG. 3 illustrates an example interaction between two clients in accordance with at least one embodiment of the present disclosure.

FIG. 3 illustrates an example interaction between two clients in accordance with at least one embodiment of the present disclosure. While the implementation illustrated in FIG. 3 comprises two clients 102 (e.g., client 102A and 102B), additional clients may be included depending on, for example, the number of participating users, the bandwidth of the network connecting clients 102, the communication capabilities of clients 102 and/or server 300, etc. Moreover, while FIG. 3 includes server 300 to manage client authentication and interaction, embodiments consistent with the present disclosure may also incorporate some or all of the functionality that will be described with respect to server 300 into clients 102A and 102B.

Clients 102 may comprise various resources to facilitate secure audio and/or video communication. Resources, as referenced herein, may comprise hardware (e.g., circuitry, components, peripherals, etc.), software (e.g., programs, data, etc.), and/or combinations thereof to provide support for specific functionality in clients 102. For example, client 102A may include at least communication module 212A', secure processing environment 104A and user interface module 208A'. Client 102B may likewise include at least communication module 212B', secure processing environment 104B and user interface module 208B'. In an example of operation, communication module 212A' may conduct secure communication 106 with communication module 212B' via a network (LAN, WAN, etc.). Clients 102A and 102B may receive encrypted communication information from secure communication 106, which may be passed, in encrypted form, to secure processing environments 104A and 104B.

Within the safety of secure processing environments 104A and 104B the encrypted communication information of secure communication 106 may be decrypted, processed and then passed to user interface modules 208A' and 208B' accordingly. In one embodiment, processed information may be passed between resources using encrypted protocols different than that employed with secure communication 106. User interface module 208A' and 208B' may include, for example, graphics and audio processing 302A and 302B and user interface equipment 304A and 304B, respectively. Graphic and audio processing 302A and 302B may include audio and graphics co-processors, chipsets, cards, etc. and related software drivers needed for processing audio and/or video information in clients 102A and 102B. User interface equipment 304A and 304B may include audio devices (e.g., speakers, headsets, microphones, etc.) and video devices (e.g., displays, cameras, etc.) incorporated in, or at least coupled to, clients 102A and 102B. In an example of operation, encrypted communication information received by secure processing environments 104A and 104B may be processed into media information (e.g., audio and/or video streams). The media information may be encrypted and then passed to graphics and audio processing 302A and 302B in user interface modules 208A' and 208 B'. Graphics and audio processing 302A and 302B may decrypt the media information, process the media information into presentation information (e.g., audio and/or video information in a format ready for presentation) and then encrypt the presentation information before passing it to user interface equipment 304A and 304B, respectively. User interface equipment 304A and 304B may receive the encrypted presentation information, decrypt the presentation information and present the presentation information to the user.

In one embodiment, secure communication system 100' may also include server 300. Server 300 may comprise one or more devices coupled to a network such as, for example, a IAN or WAN (e.g., to the Internet such as in a "cloud" implementation) over which various clients 102 may access server 300. Server 300 may be to authenticate devices 102 seeking to operate in secure communication system 100' (e.g., after devices 102 are authenticated they may be deemed clients 102) and to generally manage client interaction. Upon authentication, server 300 may be configured to distribute encryption keys for use at least during inter-client communication (e.g., secure communication 106). Encryption keys may be refreshed, for example, when clients 102 authenticate to secure communication system 100', after each communication session, etc. Server 300 may also be configured to, for example, maintain authenticated client lists (e.g., "white" lists) and a status corresponding to each white list client (e.g., "not logged in," "available," "in-call." "scheduled." etc.). In an example of operation, client 102A may access the listing, determine what other authenticated clients 102 are available in the communication system, and request server 300 to establish secure communication 106 with at least one other available client 102 (e.g., client 102B).

Figure 4:
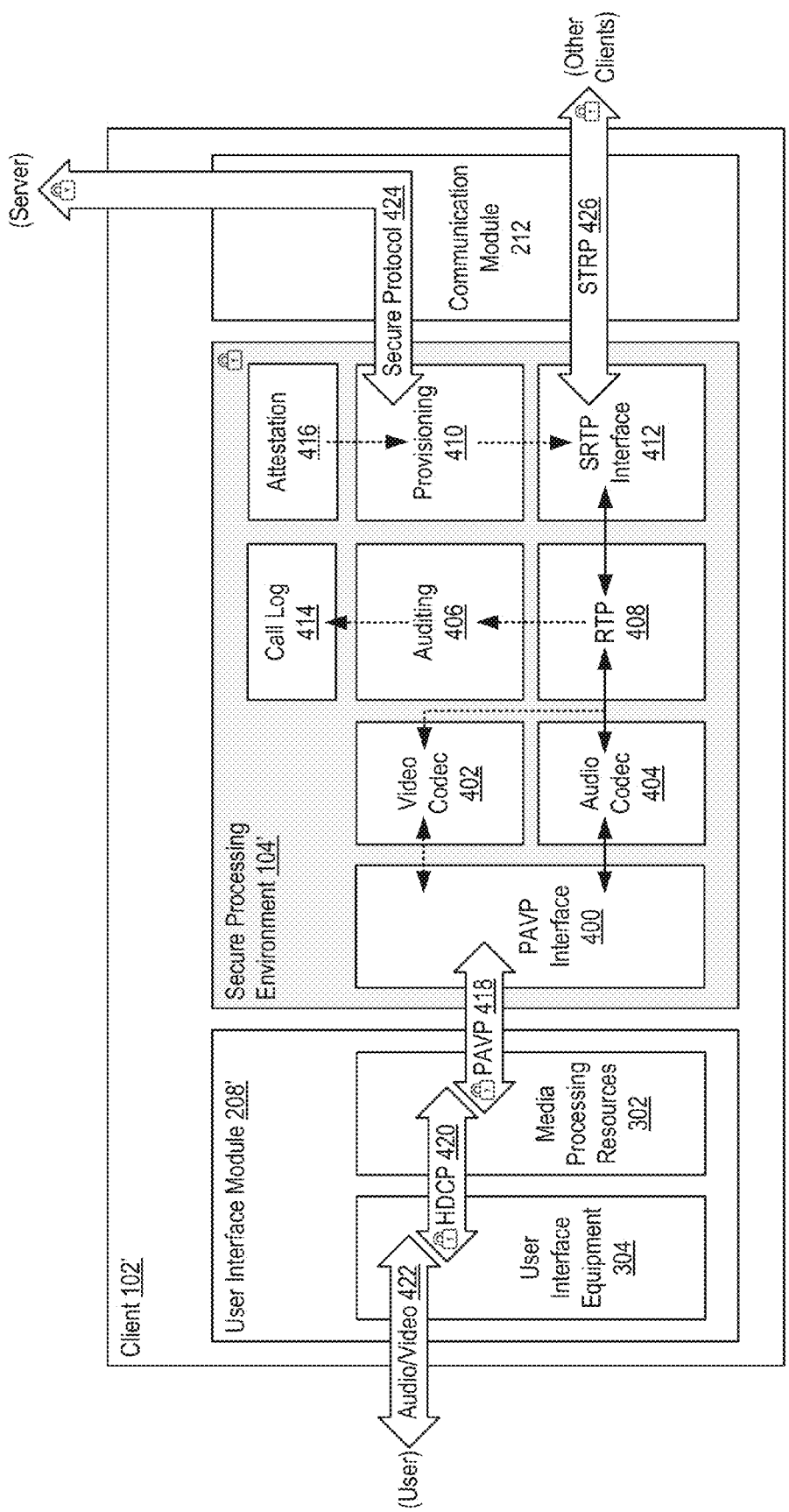
FIG. 4 illustrates example resources and communication flows within a client in accordance with at least one embodiment of the present disclosure.

FIG. 4 illustrates example resources and communication flows within a client in accordance with at least one embodiment of the present disclosure. A single example client 102' is disclosed. The configuration of example client 102' may be applied to client 102A, 102B or any other client 102 that may be participating in secure communication system 100. Moreover, the various embodiments consistent with the present disclosure are not limited to implementation only with the specific encryption protocols shown in FIG. 4. For example, encryption protocols like the Secure Real-Time Transport Protocol (SRTP) developed by the Internet Engineering Task Force (IETF), as well as the Protected Audio Video Path (PAVP) Protocol and the High-Bandwidth Digital Content Protection (HDCP) Protocol developed by the Intel Corporation, are relied upon herein only for the sake of explanation. Instead, the particular encryption protocols employed in example implementations consistent with the present disclosure may depend on, for example, the configuration of client 102', the level of security needed for inter-client interaction, device power and/or processing limitations, etc.

FIG. 4 illustrates example resources that may exist in client 102' and communication that may flow between these resources. Secure processing environment 104' may comprise, for example, PAVP interface 400, video compression/decompression (codec) resources 402, audio codec resources 404, auditing resources 406 (e.g., to generate at least call logging 414), real-time processing (RTP) resources 408, key provisioning resources 410 (e.g., to provide attestation information 416 to server 300) and SRTP resources 412. In one embodiment, upon activation provisioning resources 410 may provide attestation information 416 to server 300 via communication module 212 (e.g., using secure protocol 424). Activation may include, for example, the activation of client 102', of secure processing environment 104', of a program for initiating secure communication sessions, etc. Attestation information 416 may include information that allows server 300 to determine that secure processing environment 104' is valid and has not been compromised. For example, part of this information may include device identification for client 102' and/or the user of secure communication system 100. Location information for client 102', such as Global Positioning System (GPS) coordinates, may also be provided to establish that client 102' is actually located where it purports to be, and is not another device impersonating client 102'.

In response, server 300 may provide a private key to client 102' that is sealed within secure processing environment 104'. Server 300 may also store a public key corresponding to each authenticated client 102' (e.g., in its white list). The private key is not used outside of secure processing environment 104', but may be employed to generate other keys used in the secure communication process (e.g., a SRTP key, a PAVP key, etc.). For example, during establishment of a secure communication session, secure processing environment 104' may unseal its private key and establish a secure channel with the server using a key exchange protocol wherein client 102' signs a message with the private key and the server verifies the message using its public key (e.g., stored in the white list). This process may occur in all clients participating in a communication session (e.g., clients 102A and 102B) so that server 300 may distribute symmetric SRTP keys that may be used in secure communication 106. In one embodiment, STRP keys received by provisioning resource 410 may then be distributed to SRTP resources 412.

After symmetric keys are established, communication module 212 may transmit and receive encrypted communication information with other clients via SRTP 426, which may provide secrecy, integrity and replay protection for secure transmission of real-time digital information over a network. For example, the encrypted communication information (e.g., STRP encrypted payload) may be received inside secure processing environment 104' and may be decrypted using the STRP key and checked for authenticity and anti-replay by SRTP interface 412. The decrypted communication information may then be routed via RTP 408 to video codec resources 402 and/or audio codec resources 404 for decoding. Of course, the routing of the information to these codecs depends on whether the received communication information includes only audio information or audio and video information. Decoding may convert the received communication information into media information (e.g., audio and/or video stream information). The media information may then be encrypted by PAVP interface 400, and the encrypted media information may then be communicated as shown at 418.

PAVP communication 418 may be received by user interface module 208', which may proceed to decrypt the encrypted media information. Media processing resources 302 may process the media information for presentation by user interface equipment 304. For example, processing may include audio hardware and/or drivers preparing for sound to be generated and/or video hardware and/or drivers preparing for at least one image or video to be displayed. The result of this processing may be presentation information that may then be encoded by media processing resources 302 in preparation for HDCP communication 420. User interface equipment 304 may then receive HDCP communication 420, decrypt the encrypted presentation information, and cause sound to be generated (e.g., by internal speakers, external speakers or headphones coupled to client 102', etc.) and/or at least one image or video to be displayed (e.g., by an internal display, an external display coupled to client 102', etc.) based on the presentation information as shown at 422. The above operations may also be performed in reverse order so that information captured locally by user interface equipment 304 (e.g., including a microphone, camera, etc.) may be processed and transmitted to other clients 102. Operating in a manner such as demonstrated previously in FIG. 4 may allow communication information to be secure in transport from another client (e.g., using SRTP or a similar encryption protocol) to remain secure while being processed in secure processing environment 104', to be securely transported to user interface module 208' (e.g., using PAVP or a similar encryption protocol) and to eventually be presented to a user in a secure manner (e.g., using HDCP or a similar encryption protocol). In one embodiment, auditing resources 406 may receive session start, stop and/or other event indications from RTP 408 and may log these events to call log 414 within secure processing environment 104' corresponding to each secure communication session, adding further security and traceability.

Figure 5:
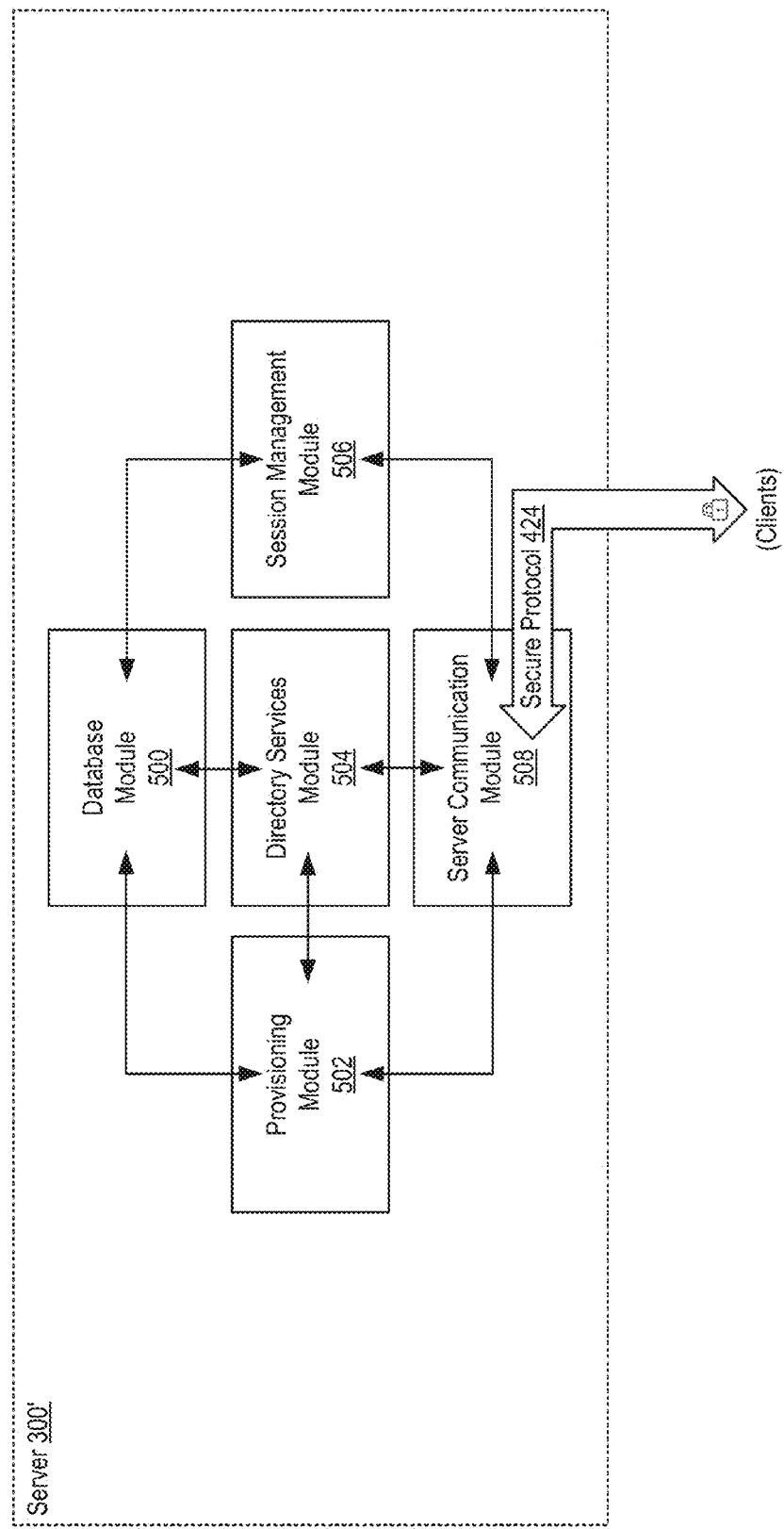
FIG. 5 illustrates example resources and communication flows within a server in accordance with at least one embodiment of the present disclosure.

FIG. 5 illustrates example resources and communication flows within a server in accordance with at least one embodiment of the present disclosure. Server 300' may include, for example, at least database module 500, provisioning module 502, directory services module 504, session management module 506 and server communication module 508. Database module 500 may include information pertaining to, for example, users/clients 102 that have been authenticated to secure communication system 100, secure communication session log information, client whitelist identifications (IDs), application status and/or performance measurement, etc. For example, information may be retained including device identification, user identification, device/user pairings, information for verifying the integrity of secure processing environment 104, client status information, etc. Provisioning module 502 may access client database 500 and/or directory services module 504 when determining whether to issue private a key to client 102 (e.g., to determine user and/or device membership in database 500, to determine if an established device/user pairing already exists, etc.), and may employ server communication module 508 to deliver the key via secure protocol 424. Directory services module 504 may access database module 500 when providing (e.g., via server communication module 508) listings and/or status information to clients 102 that has authenticated to server 300. Session management module 506 may assist clients 102 in establishing secure communication sessions. The interaction needed to establish secure communication sessions may again be performed through server communication module 508.

Figure 6:
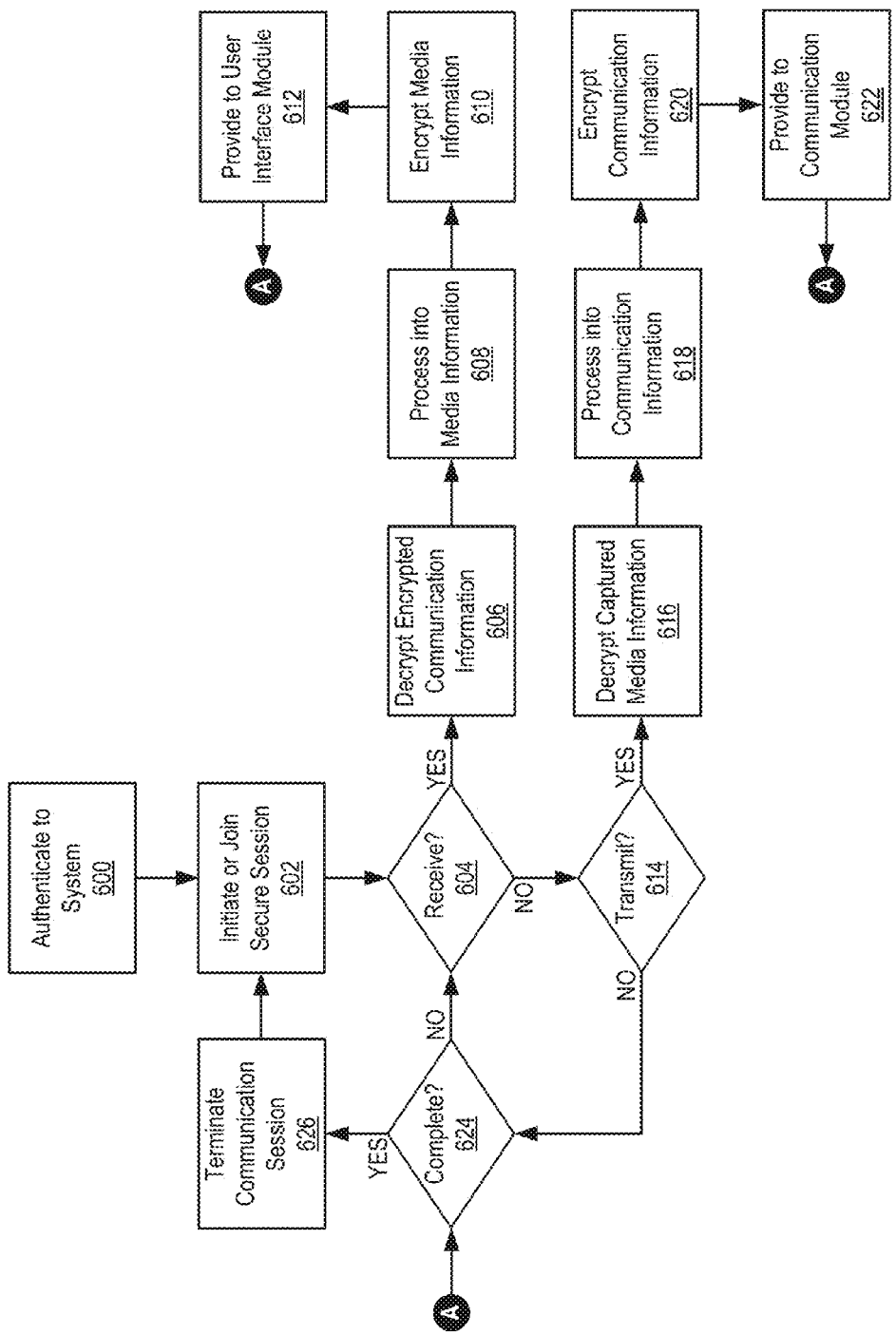
FIG. 6 illustrates example operations for an end-to-end secure communication system in accordance with at least one embodiment of the present disclosure.

FIG. 6 illustrates example operations for an end-to-end secure communication system in accordance with at least one embodiment of the present disclosure. In operation 600 a client may be authenticated by a server managing a secure communication system. Authentication may include, for example, the transmission of attestation information from the client to the server and the receiving of at least one key and possibly client list information from the server. In operation 602 a user may then initiate a new communication session or join an existing communication session (e.g., to which the user was invited by an initiating user). If initiating a new communication session, the user may select from the listing of available users received from the server and then initiate the call. A session initiation protocol (SIP) for establishing a communication session between participants and the manner by which the users may be contacted, such as an Internet Protocol (IP) address for the clients of the other participants, may be obtained from the server (e.g., the IP address for each client may be recorded by the server when each client is authenticated). During the SIP session the different clients may then agree on the media formats, transport protocols and ports that will be used during the secure communication session. The server may proceed to enforce access control and distribute symmetric STRP keys to all of the communication session participants.

A determination may then be made in operation 604 as to whether communication information has been received by the client (e.g., encrypted based on SRTP). If in operation 604 it is determined that at least encrypted communication information has been received in the client, then in operation 606 the encrypted communication information may be decrypted in the secure processing environment. The decrypted communication information may then be processed (e.g., decompressed by audio and/or video codecs) into media information in operation 608, and the media information may be encrypted (e.g., based on PAVP) for transmission from the secure processing environment in operation 610. In operation 612 the encrypted media information may then be provided to a user interface module in the client (e.g., for processing/presentation, an embodiment of which will be disclosed in FIG. 7-10). Operation 612 may be followed by operation 624 (e.g., as shown by on-page jump reference "A") wherein a determination may be made as to whether the current communication session is complete. If it is determined in operation 624 that the communication session is complete, then in operation 626 the current communication session may terminate followed by a return to operation 602 where the client may prepare to initiate a new communication session or be invited into an existing communication session. If in operation 624 it is determined that the current communication session is not complete, then in operation 604 a determination may again be made as to whether the client has received encrypted communication information.

If in operation 604 it is determined that no encrypted communication information has been received, a further determination may be made in operation 614 as to whether the client has captured any information (e.g., sound, image or video information) for transmission to other clients). If in operation 614 it is determined that locally captured information is ready for transmission, then in operation 616 encrypted media information may be received from the user interface module in the client into the secure processing environment where it may then be decrypted (e.g., based on PAVP). In operation 618 the decrypted media information may be processed into communication information (e.g., information ready for transmission to other clients), and the communication information may then be encrypted (e.g., using STRP encryption) in operation 620. The encrypted communication information may then be provided to a communication module in the device in operation 622 (e.g., for transmission to other clients). Following a determination that there is no information captured by the client for transmission to other clients in operation 614, or alternatively following operation 622, a determination may again be made in operation 624 as to whether the current communication session is complete, which may proceed in the same manner as previously set forth above.

Figure 7:
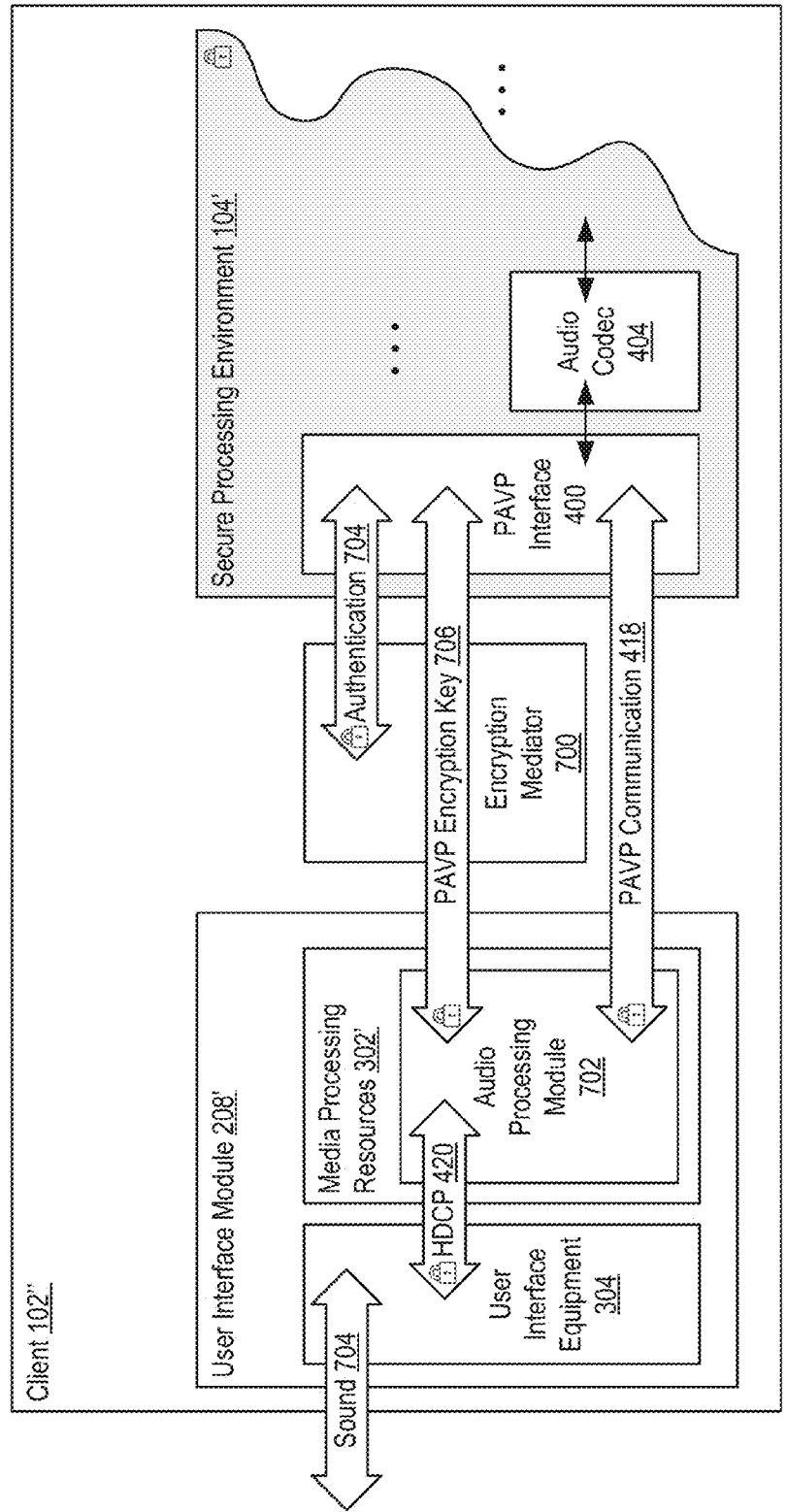
FIG. 7 illustrates example audio-related communication flows in accordance with at least one embodiment of the present disclosure.
Figure 9:
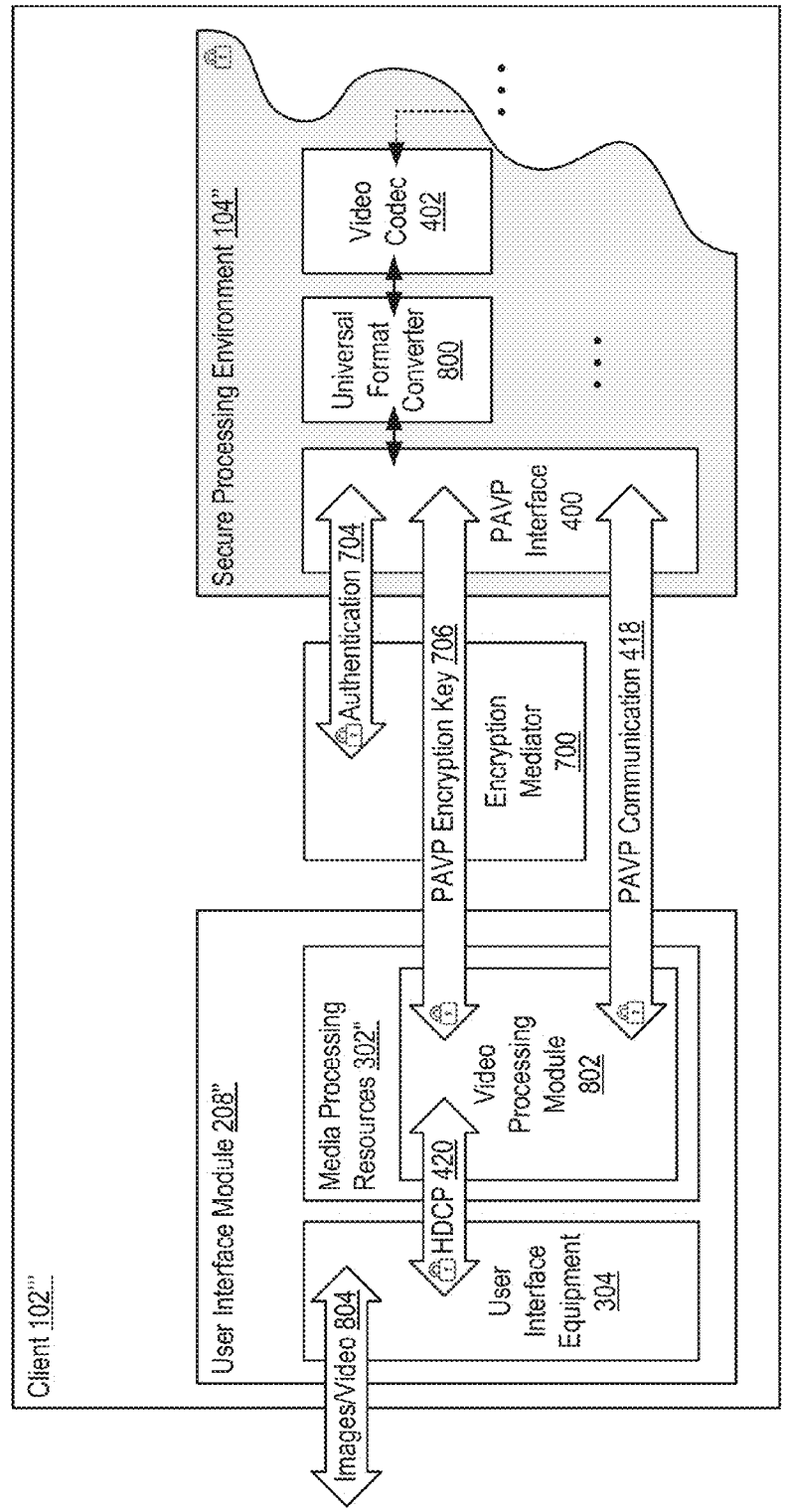
FIG. 9 illustrates example video-related communication flows in accordance with at least one embodiment of the present disclosure.
Figure 10:
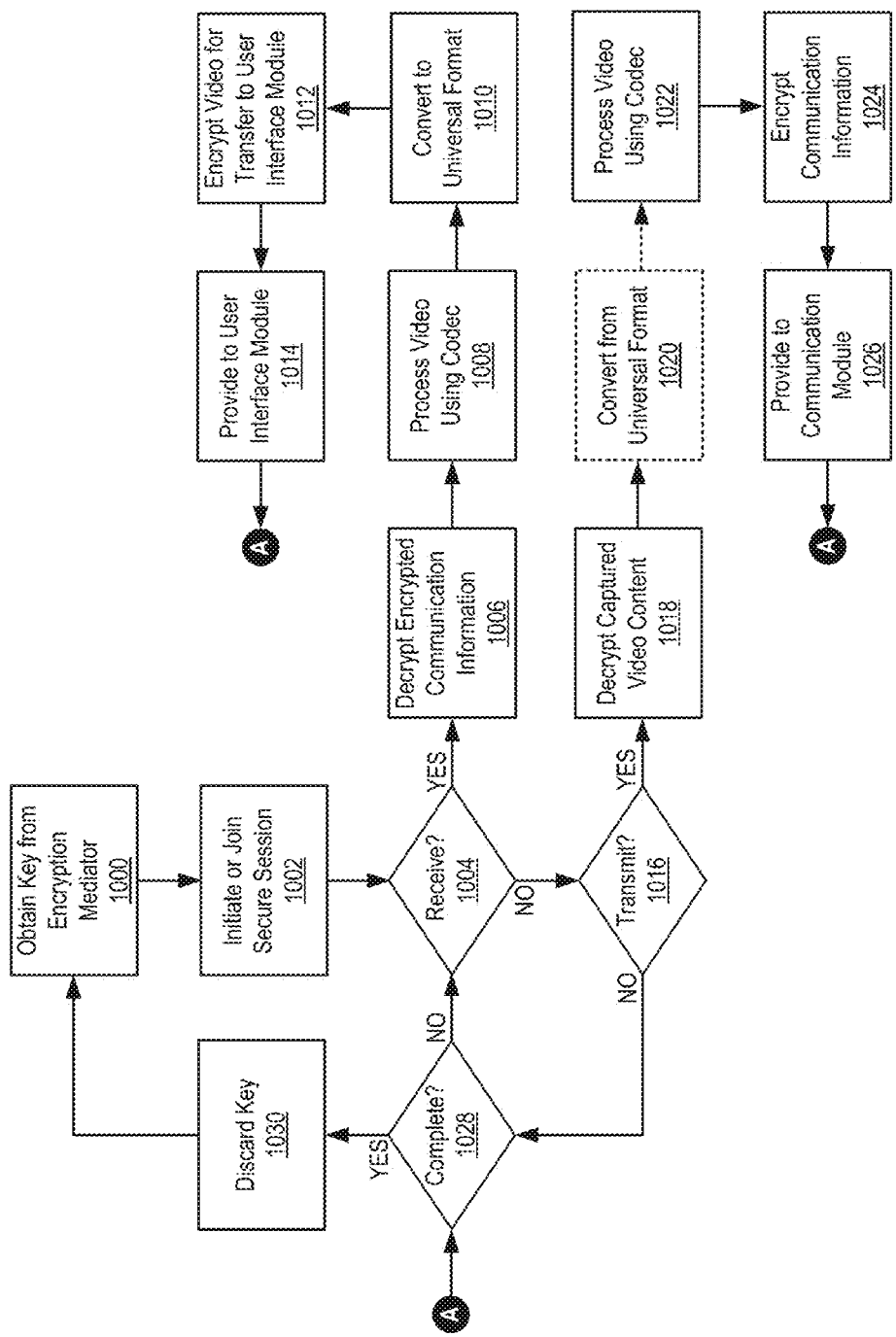
FIG. 10 illustrates example operations for video-related communication flows in accordance with at least one embodiment of the present disclosure.

FIG. 7 illustrates example audio-related communication flows in accordance with at least one embodiment of the present disclosure. In particular, FIG. 7 discloses an example implementation consistent with the present disclosure by which audio information derived from encrypted communication information may be processed and presented by the client while still maintaining the security of the audio information until presentation. It is important to note that while FIG. 7-8 disclose example equipment and operations for audio processing and FIG. 9-10 show example equipment and operations for video processing, that these embodiments are usable together for to support combined audio and video communication. Client 102" may comprise user interface module 208' and secure processing environment 104' similar to FIG. 5. However, encryption mediator 700 may be interposed between these two modules to control key distribution. Encryption mediator 700 may be, for example, a lower level, high privilege control system in client 102". For example, encryption mediator 700 may be hardware-based like the Intel Manageability Engine incorporated into processor chipsets manufactured by the Intel Corporation. Hardware-based control systems operate at privilege levels above general device applications and even operation system software, and thus, may be substantially more resistant to malware attacks than software-based solutions.

Encryption mediator 700 may provide encryption keys to at least secure processing environment 104' and user interface module 208' for use in encrypting/decrypting media (e.g., audio and/or video information). A process by which secure processing environment 104' may authenticate to server 300 has already been described herein. Secure processing environment 104' may also authenticate to encryption mediator 700 to establish that secure processing environment 104' has not been compromised and is entitled to receive encryption keys for use in communications with user interface module 208' (e.g., PAVP keys). The encryption key may remain valid during at least the current communication session in which client 102" is about to engage, and may then expire after the current communication session is complete. In another embodiment, the encryption key may remain valid until secure processing environment 104" is deactivated (e.g., until client 102" is powered down). FIG. 7 discloses an example communication flow that applies specifically to audio processing, though some aspects may also be applicable to video processing as will be shown in FIG. 9.

In one embodiment, an encryption private key (e.g., a PAVP key) that may be part of an Independent Software Vendor (ISV) certificate may be provisioned to secure processing environment 104'. For example, the encryption private key may be provisioned to secure processing environment 104' when secure communication session client software is installed in client 102". The private key may be employed in authentication communication 704 to establish that secure processing environment 104' is authentic, intact and able to received encryption keys 706 that may be distributed to, for example PAVP interface 400 and audio processing module 702. After PAVP keys have been established in both secure processing environment 104' and user interface module 208', audio codec resources 404 may receive compressed audio information (e.g., compressed audio frames) for processing. Audio codec resources 404 may decompress the compressed audio frames and may then encrypt the audio frames for transmission via PAVP interface 400. The encrypted audio information may then be conveyed, as shown by PAVP communication 418, to audio processing module 702. For example, the encrypted audio frames may be placed in an audio buffer accessible to audio processing module 702. Audio processing module 702 may then decrypt the encrypted audio frames in the audio buffer and prepare them for presentation by user interface module 304 (e.g., the audio frames may be processed into audio presentation information). The audio presentation information may then be encrypted in audio processing module 702 (e.g., using HDCP encryption) and may be provided to user interface equipment 304 as illustrated by HDCP communication 420. The encrypted audio presentation information may then be decrypted, and user interface equipment 304 (e.g., internal speakers, external speaker(s) or headphones coupled to client 102", etc.) may cause sound 704 to be generated based on the decrypted presentation information. Similar to FIG. 4, the communication flows disclosed in FIG. 7 may also be reversed to provide sound captured by client 102" (e.g., via a microphone, etc.) to other clients 102. In this manner, audio information received from other clients 102, or captured by client 102" for transmission to other clients 102, may remain secure until presentation.

Figure 8:
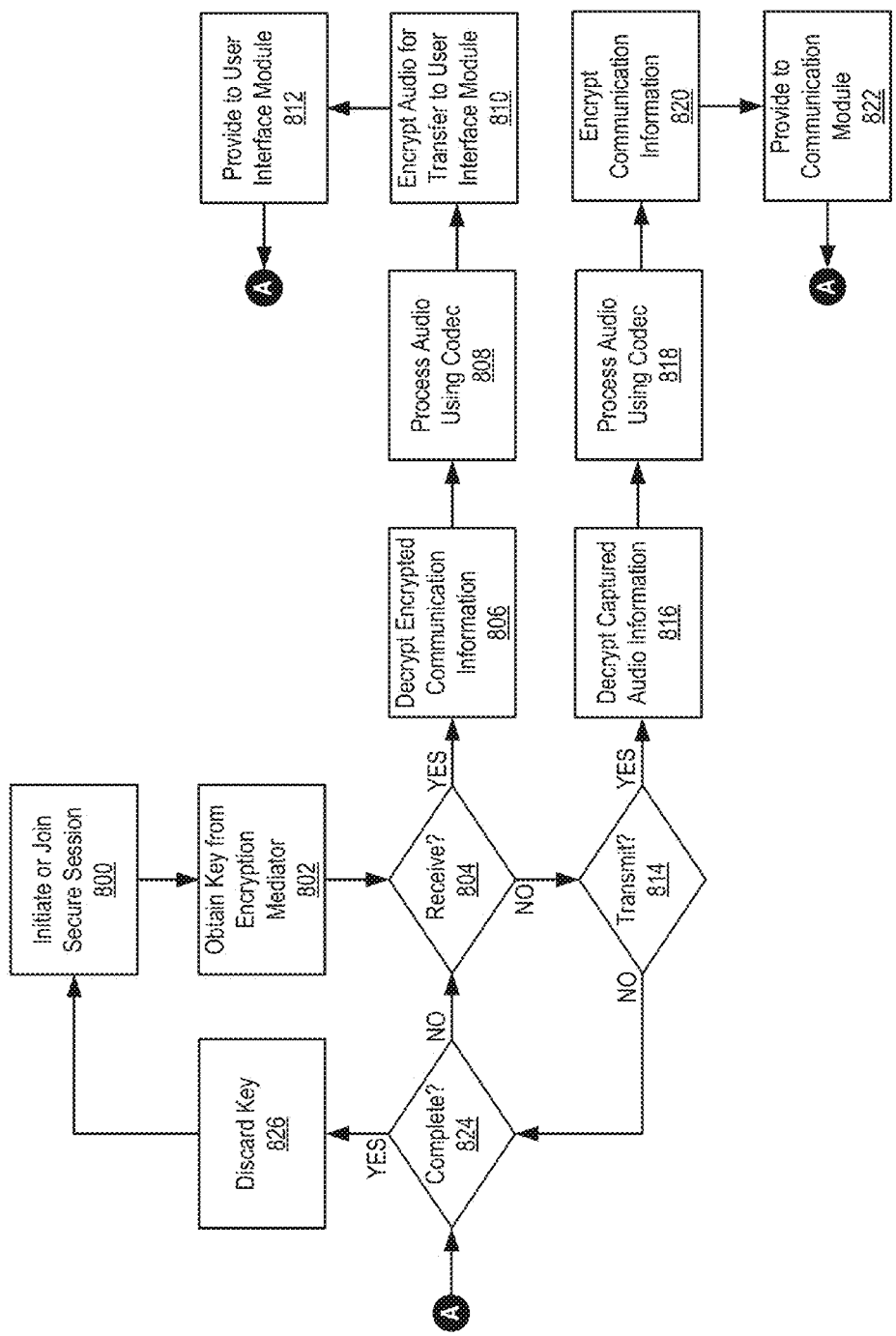
FIG. 8 illustrates example operations for audio-related communication flows in accordance with at least one embodiment of the present disclosure.

FIG. 8 illustrates example operations for audio-related communication flows in accordance with at least one embodiment of the present disclosure. Initially, in operation 800 a client may join a new secure communication session, or alternatively, may be invited to join an existing secure communication session. In operation 802 a secure processing environment in the client may obtain an encryption key from an encryption mediator also in the client. For example, the secure processing environment may present a previously provided private key to the encryption mediator as part of authentication, and if the secure processing environment is authenticated, the encryption mediatory may then provide the encryption key.

In operation 804 a determination may be made as to whether the client has received encrypted communication information including at least audio content. If in operation 804 it is determined that encrypted communication information including at least audio content has been received, then in operation 806 the communication information may be decrypted. The decrypted communication information may then be processed (e.g., using an audio codec) in operation 808 to generate audio information. The audio information may then be encrypted in operation 810 in preparation for provision to a user interface module in the client. The encrypted audio information may be provided to the user interface module in operation 812. Operation 812 may be followed by operation 824 (e.g., as shown by on-page jump reference "A") wherein a determination may be made as to whether the current secure communication session is complete. A determination that the current secure communication session is not complete in operation 824 may be followed by a return to operation 804 to determine if any further encrypted communication information including at least audio information has been received in the client. Otherwise, if in operation 824 it is determined that the current secure communication session is complete, then in operation 826 the encryption key received from the encryption mediator for the current secure communication session may be discarded and in operation 800 preparations may be made to initiate a new secure communication session or to join an existing secure communication session.

If in operation 804 it is determined that no new encrypted communication information including at least audio information has been received, then in operation 814 a determination may be made as to whether at least audio information has been captured by the user interface module client for transmission to other clients. If a determination is made in operation 814 that at least audio information has been captured and is ready for transmission, then in operation 816, the captured audio information (e.g., received from the user interface module) may be decrypted, the decrypted audio information may then be processed by the audio codec to generate communication information in operation 818, and the communication information may then be encrypted in preparation for transmission to other clients in operation 820. The encrypted communication information may then be provided to a communication module in the client for transmission to other clients in operation 822. Following a determination that there no audio information has been captured by the client for transmission to other clients in operation 814, or alternatively following operation 822, a determination may again be made in operation 824 as to whether the current communication session is complete, which may proceed in the same manner as previously set forth above.

FIG. 9 illustrates example video-related communication flows in accordance with at least one embodiment of the present disclosure. In one embodiment, video processing may include an additional conversion not needed for audio processing. Applications using certain encryption protocols (e.g., PAVP) have typically encrypted encoded video content based on the graphics hardware in a device (e.g., client 102'''). This approach constrains applications to using only the available hardware-supported PAVP encoding formats, and prevents client 102''' from taking advantage of the proliferation of various software-based encoding formats that provide better compression ratios for the same bit rate. As a result, applications that are dependent on hardware for encoding algorithms cannot take advantage of the latest advances in encoding technology. However, encryption algorithms like PAVP (e.g., with the release of the Sandy Bridge SoC by Intel Corporation) now support rendering of encrypted bitmaps that correspond to raw video frames. This may suggest a different approach to secure video rending: a stream of video content can be encoded using any encoding algorithm as long as a corresponding software decoder is used on the receiver. By protecting the execution of a software-based video decoder in secure processing environment 104", client 102''' can use any video encoding format in software and encrypt the output of the decoder (e.g., raw video frame bitmap) for PAVP graphics hardware, thus offering a much more flexible solution.

In FIG. 9, encryption mediator may again authenticate secure processing environment 104" and may provide encryption keys to at least PAVP interface 400 and to user interface module 208" (e.g., to video processing module 802 in media processing resources 302"). When new communication information including at least video information is received by secure processing environment 104", the communication information may be decoded (e.g., decompressed via video codec 402). The decoded video information may then be converted into a "universal format" by universal format converter 800. Universal format, as referenced herein, is a video format that all clients 102 may be able to process without having to worry about the type of device, graphics hardware capability or compatibility, etc. In this example, a universal format may be bitmaps since PAVP now supports the transmission of encrypted bitmaps. The universal format video may then be encrypted by PAVP interface 400 and provided to video processing module 802 as illustrated by PAVP communication 418 (e.g., may be placed in the video buffer of video processing module 802 via a graphics driver, such as Microsoft's GPUCP API). Video processing module 802 may decrypt the encrypted universal format video, may process the decrypted universal video into video presentation information and may then encrypt the video presentation information (e.g., using HDCP encryption) in preparation for transmission to user interface equipment 304 as shown at 420. For example, communication 420 may occur via an HDMI port in client 102''' to which an internal display and/or external display is coupled. User interface equipment 304 (e.g., the internal display and/or external display) may then receive the encrypted video presentation information, decrypt the encrypted video presentation information and cause at least one image or video to be displayed to a user based on the decrypted presentation information. Similar to FIG. 7, the communication flows illustrated in FIG. 8 may also be reversed to provide video captured by client 102" (e.g., via a camera, etc.) to other clients 102. In this manner, video information received from other clients 102, or captured by client 102" for transmission to other clients 102, may remain secure until presentation.

FIG. 10 illustrates example operations for video-related communication flows in accordance with at least one embodiment of the present disclosure. Initially, in operation 1000 a client may join a new secure communication session, or alternatively, may be invited to join an existing secure communication session. In operation 1002 a secure processing environment in the client may obtain an encryption key from an encryption mediator also in the client. For example, the secure processing environment may present a previously provided private key to the encryption mediator as part of authentication, and if the secure processing environment is authenticated, the encryption mediatory may then provide the encryption key.

In operation 1004 a determination may be made as to whether the client has received encrypted communication information including at least video content (e.g., at least one image or video). If in operation 1004 it is determined that encrypted communication information including at least video content has been received, then in operation 1006 the communication information may be decrypted. The decrypted communication information may then be processed (e.g., using a video codec) in operation 1008 to generate audio information. The video information may then be converted into a universal format (e.g., bitmaps) in operation 1010. The universal format video information may then be encrypted in operation 1012 in preparation for provision to a user interface module in the client. The encrypted audio information may be provided to the user interface module in operation 1014. Operation 1014 may be followed by operation 1028 (e.g., as shown by on-page jump reference "A") wherein a determination may be made as to whether the current secure communication session is complete. A determination that the current secure communication session is not complete in operation 1028 may be followed by a return to operation 1004 to determine if any further encrypted communication information including at least video information has been received in the client. Otherwise, if in operation 1028 it is determined that the current secure communication session is complete, then in operation 1030 the encryption key received from the encryption mediator for the current secure communication session may be discarded and in operation 1000 preparations may be made to initiate a new secure communication session or to join an existing secure communication session.

If in operation 1004 it is determined that no new encrypted communication information including at least audio information has been received, then in operation 1016 a determination may be made as to whether at least video information has been captured by the user interface module client for transmission to other clients. If a determination is made in operation 1016 that at least video information has been captured and is ready for transmission, then in operation 1018, the captured audio information (e.g., received from the user interface module) may be decrypted. If necessary, the decrypted video information may be converted into a format other than the universal format (e.g., bitmap) in optional operation 1020. The video information may then be processed (e.g., compressed) by the video codec to generate communication information in operation 1022 and the communication information may then be encrypted in preparation for transmission to other clients in operation 1024. The encrypted communication information may then be provided to a communication module in the client for transmission to other clients in operation 1026. Following a determination that there no video information has been captured by the client for transmission to other clients in operation 1016, or alternatively following operation 1026, a determination may again be made in operation 1028 as to whether the current communication session is complete, which may proceed in the same manner as previously set forth above.

While FIGS. 6, 8 and 10 illustrate operations according to different embodiments, it is to be understood that not all of the operations depicted in FIGS. 6, 8 and 10 are necessary for other embodiments. Indeed, it is fully contemplated herein that in other embodiments of the present disclosure, the operations depicted in FIGS. 6, 8 and 10, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories. Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to an end-to-end secure communication system wherein, in addition to encrypting transmissions between clients, communication-related operations occurring within each client may also be secured. Each client may comprise a secure processing environment to process encrypted communication information received from other clients and locally-captured media information for transmission to other clients. The secure processing environment may include resources to decrypt received encrypted communication information and to process the communication information into media information for presentation by the client. The secure processing environment may also operate in reverse to provide locally recorded audio, image, video, etc. to other clients. Encryption protocols may be employed at various stages of information processing in the client to help ensure that information being transferred between the processing resources cannot be read, copied, altered, etc. In one example implementation, a server may manage interaction between clients, provision encryption keys, etc.

The following examples pertain to further embodiments. In one example there is provided a device. The device may include a communication module to receive at least encrypted communication information as part of a secure communication session, a user interface module to cause media information to be presented, and a secure processing environment to at least decrypt the received encrypted communication information based on a first encryption protocol, process the decrypted communication information into the media information, encrypt the media information based on a second encryption protocol and provide the encrypted media information to the user interface module.

The above example device may be further configured, wherein the first encryption protocol is a Secure Real-Time Transport Protocol (SRTP).

The above example device may be further configured, alone or in combination with the above further configurations, wherein the media information comprises at least one of audio information or video information, and causing media information to be presented includes at least one of causing sound to be generated based on the audio information or causing at least one image or video to be displayed based on the video information.

The above example device may be further configured, alone or in combination with the above further configurations, wherein the user interface module comprises media processing resources to receive the encrypted media information from the secure processing environment, decrypt the encrypted media information based on the second encryption protocol, process the decrypted media information into presentation information and encrypt the presentation information based on a third encryption protocol. In this configuration the example device may be further configured, wherein the user interface module further comprises user interface equipment to receive the encrypted presentation information from the media processing resources, decrypt the encrypted presentation information based on the third encryption protocol and cause at least one of sound to be generated or at least one image or video to be displayed based on the decrypted presentation information. In this configuration the example device may be further configured, wherein the second encryption protocol is a Protected Audio Video Path (PAVP) protocol. In this configuration the example device may be further configured, wherein the third encryption protocol is a High-bandwidth Digital Copyright Protection (HDCP) protocol.

The above example device may be further configured, alone or in combination with the above further configurations, wherein the secure processing environment comprises resources including key provisioning resources, encryption/decryption resources for the first and second encryption protocols and media compression/decompression (codec) resources. In this configuration the example device may be further configured, wherein the key provisioning resources are at least to authenticate the device with a server and to obtain an encryption key for the first encryption protocol. In this configuration the example device may be further configured, wherein the secure processing environment further comprises auditing resources to at least log information about the secure communication session. In this configuration the example device may be further configured, wherein the device further comprises at least a processing module and a memory module, the processing module being to authenticate programs associated with the secure processing environment by measuring a cryptographic hash of each program when loaded and comparing the measurement to a previously computed signed measurement stored in each program.

The above example device may be further configured, alone or in combination with the above further configurations, wherein the user interface module is further to capture media information, encrypt the captured media information based on the second encryption protocol, and provide the encrypted captured media information to the secure processing environment, the secure processing environment is further to receive the encrypted captured media information from the user interface module, decrypt the encrypted captured media information based on the second encryption protocol, process the decrypted captured media information into communication information, encrypt the communication information based on the first encryption protocol and provide the encrypted communication information to the communication module, and the communication module is further to transmit the encrypted communication information as part of the communication session.

In another example there is provided a method. The method may include receiving encrypted communication information in a communication module in a device, the encrypted communication being part of a secure communication session, decrypting the encrypted communication information in a secure processing environment in the device, the decryption being based on a first encryption protocol, processing the decrypted communication information into media information in the secure processing environment, encrypting the media information in the secure processing environment, the encryption being based on a second encryption protocol and providing the encrypted media information to a user interface module in the device.

The above example method may further comprise authenticating the device to a secure communication system prior to receiving the encrypted communication information. In this configuration the example method may be further configured, wherein authenticating the device comprises providing device authentication information to a server and receiving at least one of an encryption key for the first encryption protocol or a list of authenticated secure communication system users.

The above example method may further comprise, alone or in combination with the above further configurations, receiving the encrypted media information in the user interface module, decrypting the encrypted media information in the user interface module, the decryption being based on the second encryption protocol and causing the decrypted media information to be presented.

The above example method may further comprise, alone or in combination with the above further configurations, authenticating programs associated with the secure processing environment by measuring a cryptographic hash of each program when loaded and comparing the measurement to a previously computed signed measurement stored in each program.

The above example method may further comprise, alone or in combination with the above further configurations, capturing media information in the user interface module, encrypting the captured media information in the user interface module, the encryption being based on the second encryption protocol, providing the encrypted captured media information to the secure processing environment, receiving the encrypted captured media information from the user interface module in the secure processing environment, decrypting the encrypted captured media information in the secure processing environment, the decryption being based on the second encryption protocol processing the decrypted captured media information into communication information in the secure processing environment, encrypting the communication information in the secure processing environment, the encryption being based on the first encryption protocol, providing the encrypted communication information to the communication module and transmitting the encrypted communication information from the communication module as part of the secure communication session.

In another example there is provided at least one at least one machine-readable storage medium. The machine readable storage medium may have stored thereon, individually or in combination, instructions that when executed by one or more processors result in the following operations comprising receiving encrypted communication information in a communication module in a device, the encrypted communication being part of a secure communication session, decrypting the encrypted communication information in a secure processing environment in the device, the decryption being based on a first encryption protocol, processing the decrypted communication information into media information in the secure processing environment, encrypting the media information in the secure processing environment, the encryption being based on a second encryption protocol and providing the encrypted media information to a user interface module in the device.

The above example medium may further comprise instructions that when executed by one or more processors result in the following operations comprising authenticating the device to a secure communication system prior to receiving the encrypted communication information. In this configuration the above example medium may be further configured, wherein authenticating the device comprises providing device authentication information to a server and receiving at least one of an encryption key for the first encryption protocol or a list of authenticated secure communication system users.

The above example medium may further comprise, alone or in combination with the above further configurations, instructions that when executed by one or more processors result in the following operations comprising receiving the encrypted media information in the user interface module, decrypting the encrypted media information in the user interface module, the decryption being based on the second encryption protocol and causing the decrypted media information to be presented.

The above example medium may further comprise, alone or in combination with the above further configurations, instructions that when executed by one or more processors result in the following operations comprising authenticating programs associated with the secure processing environment by measuring a cryptographic hash of each program when loaded and comparing the measurement to a previously computed signed measurement stored in each program.

The above example medium may further comprise, alone or in combination with the above further configurations, instructions that when executed by one or more processors result in the following operations comprising capturing media information in the user interface module, encrypting the captured media information in the user interface module, the encryption being based on the second encryption protocol, providing the encrypted captured media information to the secure processing environment, receiving the encrypted captured media information from the user interface module in the secure processing environment, decrypting the encrypted captured media information in the secure processing environment, the decryption being based on the second encryption protocol, processing the decrypted captured media information into communication information in the secure processing environment, encrypting the communication information in the secure processing environment, the encryption being based on the first encryption protocol, providing the encrypted communication information to the communication module and transmitting the encrypted communication information from the communication module as part of the secure communication session.

In another example there is provided a device. The device may include a secure processing environment to process communication information into media information and to encrypt the media information based on an encryption protocol, a user interface module to decrypt the encrypted media information based on the encryption protocol and to cause the decrypted media information to be presented, and an encryption mediator to generate encryption keys for use with the encryption protocol and to provide the encryption keys to the secure processing environment and the user interface module.

The above example device may be further configured, wherein the secure processing environment comprises at least a private key and the secure processing environment is further to authenticate to the encryption mediator using the private key prior to receiving the encryption key. In this configuration the example device may be further configured, wherein the private key is provisioned to resources within the secure processing environment by a resource provider.

The above example device may be further configured, alone or in combination with the above further configurations, wherein the media information comprises at least one of audio information or video information, and causing the decrypted media information to be presented includes at least one of causing sound to be generated based on the audio information or causing at least one image or video to be displayed based on the video information. In this configuration the device may be further configured, wherein the secure processing environment comprises audio compression/decompression (codec) resources to process the audio information and encryption interface resources to encrypt the processed audio information using the encryption key and to place the encrypted processed audio presentation information into an audio buffer in the device. In this configuration the example device may be further configured, wherein the secure processing environment comprises video compression/decompression (codec) resources to process the video information, conversion resources to convert the processed video information into a universal format video, and encryption interface resources to encrypt the universal format video using the encryption key and to place the encrypted universal format video into a video buffer in the device. In this configuration the device may be further configured, wherein the user interface module comprises media processing resources to decrypt at least one of the encrypted processed audio information or the universal format video based on the encryption protocol process at least one of the decrypted processed audio information into audio presentation information or the universal format video information into video presentation information, and encrypt at least one of the audio presentation information or video presentation information based on a second encryption protocol, and user interface equipment to decrypt at least one of the encrypted audio presentation information or encrypted video presentation information based on the second encryption protocol and cause at least one of sound to be generated based on the decrypted audio presentation information or at least one image or video to be displayed based on the decrypted video presentation information. In this configuration the example device may be further configured, wherein the encryption protocol is a Protected Audio Video Path (PAVP) protocol and the second encryption protocol is a High-bandwidth Digital Copyright Protection (HDCP) protocol.

The above example device may be further configured, alone or in combination with the above further configurations, wherein the encryption mediator is part of a low-level control system at least partially based on hardware within the device.

The above example device may be further configured, alone or in combination with the above further configurations, wherein the user interface module is further to capture media information and encrypt the media information based on the encryption protocol, and the secure processing environment is further to decrypt the media information based on the encryption protocol and process the media information into communication information.

In another example there is provided a method. The method may comprise generating encryption keys in a device for use with an encryption protocol, providing the encryption keys to a secure processing environment and a user interface module in the device, processing communication information into media information in the secure processing environment, encrypting the media information in the secure processing environment using the encryption key, decrypting the encrypted media information in the user interface module using the encryption key and causing the decrypted media information to be presented.

The above example method may further comprise authenticating the secure processing environment to an encryption mediator in the device using a private key prior to providing the encryption key.

The above example method may be further configured, alone or in combination with the above further configurations, wherein the media information comprises at least one of audio information or video information, and causing the decrypted media information to be presented includes at least one of causing sound to be generated based on the audio information or causing at least one image or video to be displayed based on the video information. In this configuration the example method may further comprise processing the audio information in the secure processing module, encrypting the processed audio information based on the encryption key and placing the encrypted processed audio presentation information into an audio buffer in the device. In this configuration the example method may further comprise processing the video information in the secure processing module, converting the processed video information into universal format video, encrypting the universal format video based on the encryption key and placing the encrypted universal format video into a video buffer in the device. The above example method may further comprise decrypting at least one of the encrypted processed audio information or the universal format video based on the encryption protocol in the user interface module, processing at least one of the decrypted processed audio information into audio presentation information or the universal format video information into video presentation information, encrypting at least one of the audio presentation information or video presentation information based on a second encryption protocol, decrypting at least one of the encrypted audio presentation information or encrypted video presentation information based on the second encryption protocol and causing at least one of sound to be generated based on the decrypted audio presentation information or at least one image or video to be displayed based on the decrypted video presentation information.

The above example method may further comprise, alone or in combination with the above further configurations, capturing media information in the user interface module, encrypting the media information based on the encryption protocol in the user interface module, decrypting the media information based on the encryption protocol in the secure processing module and processing the media information into communication information in the secure processing module.

In another example there is provided at least one machine-readable storage medium. The machine-readable storage medium having stored thereon, individually or in combination, instructions that when executed by one or more processors result in the following operations comprising generating encryption keys in a device for use with an encryption protocol providing the encryption keys to a secure processing environment and a user interface module in the device; processing communication information into media information in the secure processing environment, encrypting the media information in the secure processing environment using the encryption key, decrypting the encrypted media information in the user interface module using the encryption key and causing the decrypted media information to be presented.

The above example medium may further comprise instructions that when executed by one or more processors result in the following operations comprising authenticating the secure processing environment to an encryption mediator in the device using a private key prior to providing the encryption key.

The above example medium may be further configured, alone or in combination with the above further configurations, wherein the media information comprises at least one of audio information or video information and causing the decrypted media information to be presented includes at least one of causing sound to be generated based on the audio information or causing at least one image or video to be displayed based on the video information. In this configuration the example medium may further comprise instructions that when executed by one or more processors result in the following operations comprising processing the audio information in the secure processing module, encrypting the processed audio information based on the encryption key and placing the encrypted processed audio presentation information into an audio buffer in the device. In this configuration the example medium may further comprise instructions that when executed by one or more processors result in the following operations comprising processing the video information in the secure processing module, converting the processed video information into a universal format video, encrypting the universal format video based on the encryption key and placing the encrypted universal format video into a video buffer in the device. In this configuration the example medium may further comprise instructions that when executed by one or more processors result in the following operations comprising decrypting at least one of the encrypted processed audio information or the universal format video based on the encryption protocol in the user interface module, processing at least one of the decrypted processed audio information into audio presentation information or the universal format video information into video presentation information, encrypting at least one of the audio presentation information or video presentation information based on a second encryption protocol, decrypting at least one of the encrypted audio presentation information or encrypted video presentation information based on the second encryption protocol and causing at least one of sound to be generated based on the decrypted audio presentation information or at least one image or video to be displayed based on the decrypted video presentation information.

The above example medium may further comprise, alone or in combination with the above further configurations, instructions that when executed by one or more processors result in the following operations comprising capturing media information in the user interface module, encrypting the media information based on the encryption protocol in the user interface module, decrypting the media information based on the encryption protocol in the secure processing module and processing the media information into communication information in the secure processing module.

In another example there is provided a device. The device may include a communication module to receive at least encrypted communication information as part of a secure communication session, a user interface module to cause media information to be presented and a secure processing environment to at least decrypt the received encrypted communication information based on a first encryption protocol, process the decrypted communication information into the media information, encrypt the media information based on a second encryption protocol and provide the encrypted media information to the user interface module.

The above example device may be further configured, wherein the media information comprises at least one of audio information or video information, and causing media information to be presented includes at least one of causing sound to be generated based on the audio information or causing at least one image or video to be displayed based on the video information.

The above example device may be further configured, alone or in combination with the above further configurations, wherein the user interface module comprises media processing resources to receive the encrypted media information from the secure processing environment, decrypt the encrypted media information based on the second encryption protocol, process the decrypted media information into presentation information and encrypt the presentation information based on a third encryption protocol. In this configuration the example device may be further configured, wherein the user interface module further comprises user interface equipment to receive the encrypted presentation information from the media processing resources, decrypt the encrypted presentation information based on the third encryption protocol and cause at least one of sound to be generated or at least one image or video to be displayed based on the decrypted presentation information.

The above example device may be further configured, alone or in combination with the above further configurations, wherein the secure processing environment comprises resources including key provisioning resources to authenticate the device with a server and to obtain an encryption key for the first encryption protocol, encryption/decryption resources for the first and second encryption protocols and media compression/decompression (codec) resources. In this configuration the example device may be further configured, wherein the secure processing environment further comprises auditing resources to at least log information about the secure communication session.

The above example device may be further configured, alone or in combination with the above further configurations, wherein the user interface module is further to capture media information, encrypt the captured media information based on the second encryption protocol and provide the encrypted captured media information to the secure processing environment, the secure processing environment is further to receive the encrypted captured media information from the user interface module, decrypt the encrypted captured media information based on the second encryption protocol, process the decrypted captured media information into communication information, encrypt the communication information based on the first encryption protocol and provide the encrypted communication information to the communication module, and the communication module is further to transmit the encrypted communication information as part of the communication session.

In another example there is provided a method. The method may include receiving encrypted communication information in a communication module in a device, the encrypted communication being part of a secure communication session, decrypting the encrypted communication information in a secure processing environment in the device, the decryption being based on a first encryption protocol, processing the decrypted communication information into media information in the secure processing environment, encrypting the media information in the secure processing environment, the encryption being based on a second encryption protocol and providing the encrypted media information to a user interface module in the device.

The above example method may further comprise authenticating the device to a secure communication system prior to receiving the encrypted communication information, wherein authenticating the device comprises providing device authentication information to a server and receiving at least one of an encryption key for the first encryption protocol or a list of authenticated secure communication system users.

The above example method may further comprise, alone or in combination with the above further configurations, receiving the encrypted media information in the user interface module, decrypting the encrypted media information in the user interface module, the decryption being based on the second encryption protocol and causing the decrypted media information to be presented.

The above example method may further comprise, alone or in combination with the above further configurations, capturing media information in the user interface module, encrypting the captured media information in the user interface module, the encryption being based on the second encryption protocol, providing the encrypted captured media information to the secure processing environment, receiving the encrypted captured media information from the user interface module in the secure processing environment, decrypting the encrypted captured media information in the secure processing environment, the decryption being based on the second encryption protocol, processing the decrypted captured media information into communication information in the secure processing environment, encrypting the communication information in the secure processing environment, the encryption being based on the first encryption protocol, providing the encrypted communication information to the communication module and transmitting the encrypted communication information from the communication module as part of the secure communication session.

In another example there is provided a system including at least two devices participating in a secure communication session, the system being arranged to perform any of the above example methods.

In another example embodiment there is provided a chipset arranged to perform any of the above example methods.

In another example there is provided at least one machine readable medium comprising a plurality of instructions that, in response to be being executed on a computing device, cause the computing device to carry out any of the above example methods.

In another example there is provided a device having means to perform any of the above example methods In another example there is provided a system. The system may include means for receiving encrypted communication information in a communication module in a device, the encrypted communication being part of a secure communication session, means for decrypting the encrypted communication information in a secure processing environment in the device, the decryption being based on a first encryption protocol, means for processing the decrypted communication information into media information in the secure processing environment, means for encrypting the media information in the secure processing environment, the encryption being based on a second encryption protocol and means for providing the encrypted media information to a user interface module in the device.

The above example system may further comprise means for authenticating the device to a secure communication system prior to receiving the encrypted communication information. In this configuration the system may be further configured, wherein authenticating the device comprises providing device authentication information to a server and receiving at least one of an encryption key for the first encryption protocol or a list of authenticated secure communication system users.

The above example system may further comprise, alone or in combination with the above further configurations, means for receiving the encrypted media information in the user interface module, means for decrypting the encrypted media information in the user interface module, the decryption being based on the second encryption protocol and means for causing the decrypted media information to be presented.

The above example system may further comprise, alone or in combination with the above further configurations, means for authenticating programs associated with the secure processing environment by measuring a cryptographic hash of each program when loaded and comparing the measurement to a previously computed signed measurement stored in each program.

The above example system may further comprise, alone or in combination with the above further configurations, means for capturing media information in the user interface module, means for encrypting the captured media information in the user interface module, the encryption being based on the second encryption protocol, means for providing the encrypted captured media information to the secure processing environment, means for receiving the encrypted captured media information from the user interface module in the secure processing environment, means for decrypting the encrypted captured media information in the secure processing environment, the decryption being based on the second encryption protocol, means for processing the decrypted captured media information into communication information in the secure processing environment, means for encrypting the communication information in the secure processing environment, the encryption being based on the first encryption protocol, means for providing the encrypted communication information to the communication module and means for transmitting the encrypted communication information from the communication module as part of the secure communication session.

In another example there is provided a system. The system may include means for generating encryption keys in a device for use with an encryption protocol, means for providing the encryption keys to a secure processing environment and a user interface module in the device, means for processing communication information into media information in the secure processing environment, means for encrypting the media information in the secure processing environment using the encryption key, means for decrypting the encrypted media information in the user interface module using the encryption key and means for causing the decrypted media information to be presented.

The above example system may further comprise means for authenticating the secure processing environment to an encryption mediator in the device using a private key prior to providing the encryption key.

The above example system may be further configured, alone or in combination with the above further configurations, wherein the media information comprises at least one of audio information or video information, and means for causing the decrypted media information to be presented includes at least one of causing sound to be generated based on the audio information or causing at least one image or video to be displayed based on the video information. In this configuration the example system may further comprise means for processing the audio information in the secure processing module, means for encrypting the processed audio information based on the encryption key and means for placing the encrypted processed audio presentation information into an audio buffer in the device. In this configuration the example system may further comprise means for processing the video information in the secure processing module, means for converting the processed video information into a universal format video, means for encrypting the universal format video based on the encryption key and means for placing the encrypted universal format video into a video buffer in the device. In this configuration the example system may further comprise means for decrypting at least one of the encrypted processed audio information or the universal format video based on the encryption protocol in the user interface module, means for processing at least one of the decrypted processed audio information into audio presentation information or the universal format video information into video presentation information, means for encrypting at least one of the audio presentation information or video presentation information based on a second encryption protocol, means for decrypting at least one of the encrypted audio presentation information or encrypted video presentation information based on the second encryption protocol and means for causing at least one of sound to be generated based on the decrypted audio presentation information or at least one image or video to be displayed based on the decrypted video presentation information.

The above example system may further comprise, alone or in combination with the above further configurations, means for capturing media information in the user interface module, means for encrypting the media information based on the encryption protocol in the user interface module, means for decrypting the media information based on the encryption protocol in the secure processing module and means for processing the media information into communication information in the secure processing module.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A device, comprising:
   a communication module to receive at least encrypted communication information as part of a secure communication session;
   a user interface module to cause media information to be presented; and
   a secure enclave to at least:
      decrypt the received encrypted communication information based on a first encryption protocol;
      process the decrypted communication information into the media information;
      encrypt the media information based on a second encryption protocol; and
      provide the encrypted media information to the user interface module.

2. The device of claim 1, wherein the first encryption protocol is a Secure Real-Time Transport Protocol (SRTP).

3. The device of claim 1, wherein the media information comprises at least one of audio information or video information; and
   causing media information to be presented includes at least one of causing sound to be generated based on the audio information or causing at least one image or video to be displayed based on the video information.

4. The device of claim 1, wherein the user interface module comprises media processing resources to:
   receive the encrypted media information from the secure enclave;
   decrypt the encrypted media information based on the second encryption protocol;
   process the decrypted media information into presentation information; and
   encrypt the presentation information based on a third encryption protocol.

5. The device of claim 4, wherein the user interface module further comprises user interface equipment to:
   receive the encrypted presentation information from the media processing resources;
   decrypt the encrypted presentation information based on the third encryption protocol; and
   cause at least one of sound to be generated or at least one image or video to be displayed based on the decrypted presentation information.

6. The device of claim 5, wherein the second encryption protocol is a Protected Audio Video Path (PAVP) protocol.

7. The device of claim 5, wherein the third encryption protocol is a High-bandwidth Digital Copyright Protection (HDCP) protocol.

8. The device of claim 1, wherein the secure enclave comprises resources including key provisioning resources, encryption/decryption resources for the first and second encryption protocols and media compression/decompression (codec) resources.

9. The device of claim 8, wherein the key provisioning resources are at least to authenticate the device with a server and to obtain an encryption key for the first encryption protocol.

10. The device of claim 8, wherein the secure enclave further comprises auditing resources to at least log information about the secure communication session.

11. The device of claim 8, wherein the device further comprises at least a processing module and a memory module, the processing module being to:
  authenticate programs associated with the secure enclave by measuring a cryptographic hash of each program when loaded and comparing the measurement to a previously computed signed measurement stored in each program.

12. The device of claim 1, wherein:
  the user interface module is further to:
    capture media information;
    encrypt the captured media information based on the second encryption protocol; and
    provide the encrypted captured media information to the secure enclave;
  the secure enclave is further to:
    receive the encrypted captured media information from the user interface module;
    decrypt the encrypted captured media information based on the second encryption protocol;
    process the decrypted captured media information into communication information;
    encrypt the communication information based on the first encryption protocol; and
    provide the encrypted communication information to the communication module; and
  the communication module is further to:
    transmit the encrypted communication information as part of the communication session.

13. A method, comprising:
  receiving encrypted communication information in a communication module in a device, the encrypted communication being part of a secure communication session;
  decrypting the encrypted communication information in a secure enclave in the device, the decryption being based on a first encryption protocol;
  processing the decrypted communication information into media information in the secure enclave;
  encrypting the media information in the secure enclave, the encryption being based on a second encryption protocol; and
  providing the encrypted media information to a user interface module in the device.

14. The method of claim 13, further comprising authenticating the device to a secure communication system prior to receiving the encrypted communication information.

15. The method of claim 14, wherein authenticating the device comprises providing device authentication information to a server and receiving at least one of an encryption key for the first encryption protocol or a list of authenticated secure communication system users.

16. The method of claim 13, further comprising:
  receiving the encrypted media information in the user interface module;
  decrypting the encrypted media information in the user interface module, the decryption being based on the second encryption protocol; and
  causing the decrypted media information to be presented.

17. The method of claim 13, further comprising:
  authenticating programs associated with the secure enclave by measuring a cryptographic hash of each program when loaded and comparing the measurement to a previously computed signed measurement stored in each program.

18. The method of claim 13, further comprising:
  capturing media information in the user interface module;
  encrypting the captured media information in the user interface module, the encryption being based on the second encryption protocol;
  providing the encrypted captured media information to the secure enclave;
  receiving the encrypted captured media information from the user interface module in the secure enclave;
  decrypting the encrypted captured media information in the secure processing environment, the decryption being based on the second encryption protocol;
  processing the decrypted captured media information into communication information in the secure enclave;
  encrypting the communication information in the secure enclave, the encryption being based on the first encryption protocol;
  providing the encrypted communication information to the communication module; and
  transmitting the encrypted communication information from the communication module as part of the secure communication session.

19. One or more non-transitory computer readable memories having stored thereon, individually or in combination, instructions that when executed by one or more processors result in the following operations comprising:
  receiving encrypted communication information in a communication module in a device, the encrypted communication being part of a secure communication session;
  decrypting the encrypted communication information in a secure enclave in the device, the decryption being based on a first encryption protocol;
  processing the decrypted communication information into media information in the secure enclave;
  encrypting the media information in the secure enclave, the encryption being based on a second encryption protocol; and
  providing the encrypted media information to a user interface module in the device.

20. The one or more non-transitory computer-readable memories of claim 19, further comprising instructions that when executed by one or more processors result in the following operations comprising:
  authenticating the device to a secure communication system prior to receiving the encrypted communication information.

21. The one or more non-transitory computer-readable memories of claim 20, wherein authenticating the device comprises providing device authentication information to a server and receiving at least one of an encryption key for the first encryption protocol or a list of authenticated secure communication system users.

22. The one or more non-transitory computer-readable memories of claim 19, further comprising instructions that when executed by one or more processors result in the following operations comprising:
receiving the encrypted media information in the user interface module;
decrypting the encrypted media information in the user interface module, the decryption being based on the second encryption protocol; and
causing the decrypted media information to be presented.

23. The one or more non-transitory computer-readable memories of claim 19, further comprising instructions that when executed by one or more processors result in the following operations comprising:
authenticating programs associated with the secure enclave by measuring a cryptographic hash of each program when loaded and comparing the measurement to a previously computed signed measurement stored in each program.

24. The one or more non-transitory computer-readable memories of claim 19, further comprising instructions that when executed by one or more processors result in the following operations comprising:
capturing media information in the user interface module;
encrypting the captured media information in the user interface module, the encryption being based on the second encryption protocol;
providing the encrypted captured media information to the secure enclave;
receiving the encrypted captured media information from the user interface module in the secure enclave;
decrypting the encrypted captured media information in the secure enclave, the decryption being based on the second encryption protocol;
processing the decrypted captured media information into communication information in the secure enclave;
encrypting the communication information in the secure enclave, the encryption being based on the first encryption protocol;
providing the encrypted communication information to the communication module; and
transmitting the encrypted communication information from the communication module as part of the secure communication session.

25. A device, comprising:
a secure enclave to process communication information into media information and to encrypt the media information based on an encryption protocol;
a user interface module to decrypt the encrypted media information based on the encryption protocol and to cause the decrypted media information to be presented; and
an encryption mediator to generate encryption keys for use with the encryption protocol and to provide the encryption keys to the secure enclave and the user interface module.

26. The device of claim 25, wherein the secure processing environment comprises at least a private key and the secure enclave is further to authenticate to the encryption mediator using the private key prior to receiving the encryption key.

27. The device of claim 25, wherein the private key is provisioned to resources within the secure enclave by a resource provider.

28. The device of claim 25, wherein the media information comprises at least one of audio information or video information; and
causing the decrypted media information to be presented includes at least one of causing sound to be generated based on the audio information or causing at least one image or video to be displayed based on the video information.

29. The device of claim 28, wherein the secure enclave comprises:
audio compression/decompression (codec) resources to process the audio information; and
encryption interface resources to encrypt the processed audio information using the encryption key and to place the encrypted processed audio presentation information into an audio buffer in the device.

30. The device of claim 29, wherein the secure enclave comprises:
video compression/decompression (codec) resources to process the video information;
conversion resources to convert the processed video information into a universal format video; and
encryption interface resources to encrypt the universal format video using the encryption key and to place the encrypted universal format video into a video buffer in the device.

31. The device of claim 30, wherein the user interface module comprises:
media processing resources to:
decrypt at least one of the encrypted processed audio information or the universal format video based on the encryption protocol;
process at least one of the decrypted processed audio information into audio presentation information or the universal format video information into video presentation information; and
encrypt at least one of the audio presentation information or video presentation information based on a second encryption protocol; and
user interface equipment to:
decrypt at least one of the encrypted audio presentation information or encrypted video presentation information based on the second encryption protocol; and
cause at least one of sound to be generated based on the decrypted audio presentation information or at least one image or video to be displayed based on the decrypted video presentation information.

32. The device of claim 30, wherein the encryption protocol is a Protected Audio Video Path (PAVP) protocol and the second encryption protocol is a High-bandwidth Digital Copyright Protection (HDCP) protocol.

33. The device of claim 25, wherein the encryption mediator is part of a low-level control system at least partially based on hardware within the device.

34. The device of claim 25, wherein:
the user interface module is further to:
capture media information; and
encrypt the media information based on the encryption protocol; and
the secure enclave is further to:
decrypt the media information based on the encryption protocol; and
process the media information into communication information.

35. A method, comprising:
generating encryption keys in a device for use with an encryption protocol;
providing the encryption keys to a secure processing environment and a user interface module in the device;
processing communication information into media information in the secure enclave;

encrypting the media information in the secure enclave using the encryption key;

decrypting the encrypted media information in the user interface module using the encryption key; and causing the decrypted media information to be presented.

36. The method of claim 35, further comprising:

authenticating the secure enclave to an encryption mediator in the device using a private key prior to providing the encryption key.

37. The method of claim 35, wherein the media information comprises at least one of audio information or video information; and causing the decrypted media information to be presented includes at least one of causing sound to be generated based on the audio information or causing at least one image or video to be displayed based on the video information.

38. The method of claim 37, further comprising:

processing the audio information in the secure processing module;

encrypting the processed audio information based on the encryption key; and placing the encrypted processed audio presentation information into an audio buffer in the device.

39. The method of claim 38, further comprising:

processing the video information in the secure processing module;

converting the processed video information into universal format video;

encrypting the universal format video based on the encryption key; and placing the encrypted universal format video into a video buffer in the device.

40. The method of claim 39, further comprising:

decrypting at least one of the encrypted processed audio information or the universal format video based on the encryption protocol in the user interface module;

processing at least one of the decrypted processed audio information into audio presentation information or the universal format video information into video presentation information;

encrypting at least one of the audio presentation information or video presentation information based on a second encryption protocol;

decrypting at least one of the encrypted audio presentation information or encrypted video presentation information based on the second encryption protocol; and causing at least one of sound to be generated based on the decrypted audio presentation information or at least one image or video to be displayed based on the decrypted video presentation information.

41. The method of claim 35, further comprising:

capturing media information in the user interface module;

encrypting the media information based on the encryption protocol in the user interface module;

decrypting the media information based on the encryption protocol in the secure processing module; and processing the media information into communication information in the secure processing module.

42. One or more non-transitory computer readable memories having stored thereon, individually or in combination, instructions that when executed by one or more processors result in the following operations comprising:

generating encryption keys in a device for use with an encryption protocol;

providing the encryption keys to a secure enclave and a user interface module in the device;

processing communication information into media information in the secure enclave;

encrypting the media information in the secure enclave using the encryption key;

decrypting the encrypted media information in the user interface module using the encryption key; and causing the decrypted media information to be presented.

43. The one or more non-transitory computer-readable memories of claim 42, further comprising instructions that when executed by one or more processors result in the following operations comprising:

authenticating the secure processing environment to an encryption mediator in the device using a private key prior to providing the encryption key.

44. The one or more non-transitory computer-readable memories of claim 42, wherein the media information comprises at least one of audio information or video information; and causing the decrypted media information to be presented includes at least one of causing sound to be generated based on the audio information or causing at least one image or video to be displayed based on the video information.

45. The one or more non-transitory computer-readable memories of claim 44, further comprising instructions that when executed by one or more processors result in the following operations comprising:

processing the audio information in the secure processing module;

encrypting the processed audio information based on the encryption key; and placing the encrypted processed audio presentation information into an audio buffer in the device.

46. The one or more non-transitory computer-readable memories of claim 44, further comprising instructions that when executed by one or more processors result in the following operations comprising:

processing the video information in the secure processing module;

converting the processed video information into a universal format video;

encrypting the universal format video based on the encryption key; and placing the encrypted universal format video into a video buffer in the device.

47. The one or more non-transitory computer-readable memories of claim 46, further comprising instructions that when executed by one or more processors result in the following operations comprising:

decrypting at least one of the encrypted processed audio information or the universal format video based on the encryption protocol in the user interface module;

processing at least one of the decrypted processed audio information into audio presentation information or the universal format video information into video presentation information;

encrypting at least one of the audio presentation information or video presentation information based on a second encryption protocol;

decrypting at least one of the encrypted audio presentation information or encrypted video presentation information based on the second encryption protocol; and causing at least one of sound to be generated based on the decrypted audio presentation information or at least one image or video to be displayed based on the decrypted video presentation information.

48. The one or more non-transitory computer-readable memories of claim 42, further comprising instructions that when executed by one or more processors result in the following operations comprising:
  capturing media information in the user interface module;
  encrypting the media information based on the encryption protocol in the user interface module;
  decrypting the media information based on the encryption protocol in the secure processing module; and
  processing the media information into communication information in the secure processing module.

* * * * *